United States Patent
Matsuno et al.

[11] Patent Number: 5,906,286
[45] Date of Patent: May 25, 1999

[54] HEAT-RESISTANT PRESSURE-RESISTANT AND SELF STANDING CONTAINER AND METHOD OF PRODUCING THEREOF

[75] Inventors: Kenji Matsuno; Nobuyuki Kato, both of Yokohama; Hiroo Ikegami, Sagamihara; Setsuko Nakamaki, Yokohama; Kimio Takeuchi, Kawasaki; Hotaka Fukabori; Yoshitsugu Maruhashi, both of Yokohama; Hideo Kurashima, Yokosuka, all of Japan

[73] Assignee: Toyo Seikan Kaisha, Ltd., Tokyo, Japan

[21] Appl. No.: 08/622,415

[22] Filed: Mar. 27, 1996

[30] Foreign Application Priority Data

Mar. 28, 1995 [JP] Japan .................................. 7-069918

[51] Int. Cl.$^6$ .............................. B65D 1/02; B65D 1/42; B65D 23/00
[52] U.S. Cl. ......................... 215/375; 215/373; 220/606; 220/608; 220/675
[58] Field of Search .................................... 215/373, 374, 215/375; 220/604, 606, 675, 608

[56] References Cited

U.S. PATENT DOCUMENTS

| | | | |
|---|---|---|---|
| 5,024,339 | 6/1991 | Riemer | 215/375 |
| 5,064,080 | 11/1991 | Young et al. | 215/375 |
| 5,287,978 | 2/1994 | Young et al. | 215/375 |
| 5,353,954 | 10/1994 | Steward et al. | 215/375 X |
| 5,409,750 | 4/1995 | Hamada et al. | 215/375 X |
| 5,529,196 | 6/1996 | Lane | 215/375 |

*Primary Examiner*—Sue A. Weaver
*Attorney, Agent, or Firm*—Sughrue, Mion, Zinn, Macpeak & Seas, PLLC

[57] ABSTRACT

A container is obtained by biaxially stretch-blow-molding a resin. Except the mouth-and-neck portion, vicinities thereof and the center of the bottom portion, the container as a whole is reduced in thickness under a highly drawing condition without being accompanied by whitening, and a portion constituting the bottom valley portions has an yielding load of not smaller than 25 kg/cm at 70° C. The container exhibits excellent heat resistance, pressure resistance, shock resistance as well as self-standing ability.

17 Claims, 17 Drawing Sheets

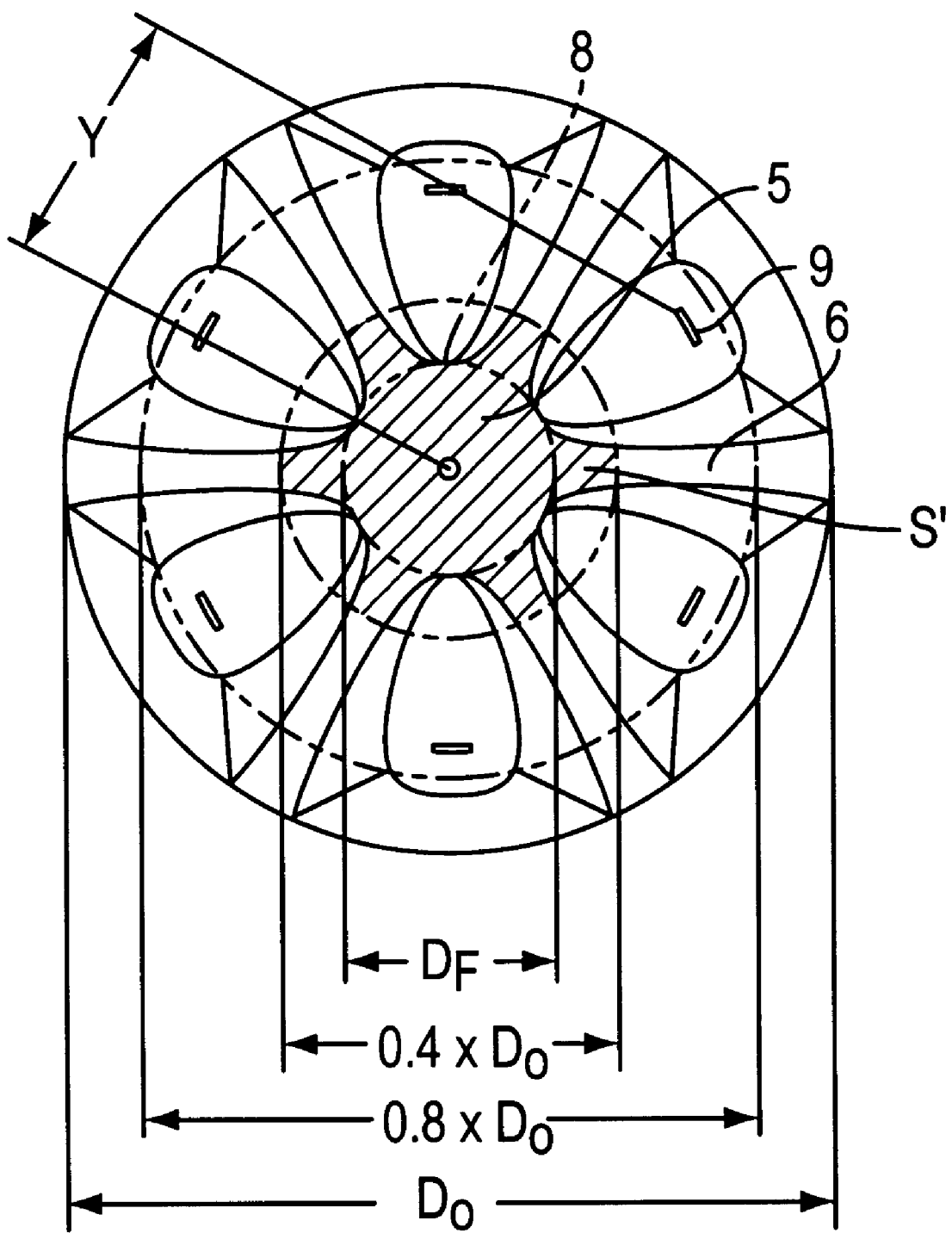

HEAT-RESISTANT PRESSURE-RESISTANT AND SELF STANDING CONTAINER AND METHOD OF PRODUCING THEREOF

BACKGROUND OF THE INVENTION

1. Field of the Invention

The present invention relates to a container having excellent heat resistance, pressure resistance and self-standing ability obtained by biaxially stretch-blow-molding a resin.

2. Description of the Prior Art

Biaxially stretch-blow-molded containers of a thermoplastic polyester such as polyethylene terephthalate (PET) have excellent transparency, surface luster as well as shock resistance, rigidity and gas-barrier property required for the bottles, and have been used as bottles for containing a variety of liquids.

In producing the bottled products, in general, the contents are poured while they are hot or the contents after having been poured are sterilized or pasteurized by heating in order to enhance preservability of the contents. However, the polyester bottles have poor heat resistance and undergo thermal deformation or shrinking and acquire reduced volumes when they are filled with contents that are hot. Because of this reason, the biaxially stretch-blow-molded containers are heat-set after they have been molded.

For those applications (heat-resistant and pressure-resistant bottles) where the bottles are subjected to the sterilization or pasteurization by heating after they have been hermetically filled with the contents which produce pressure by themselves, however, the pressure and heat act simultaneously upon the bottom of the bottles causing them to swell due to heat-creeping phenomenon. The above-mentioned heat-setting only is not quite enough. Therefore, the bottles have been obtained having a round bottom which is provided with a separate skirt member (base cup) (Japanese Laid-Open Utility Model Publication No. 142433/1980 and Japanese Patent Publication No. 30982/1986).

In order to minimize the deformation in the bottom of such a two-piece heat-resistant and pressure-resistant bottle caused by heat and pressure, Japanese Patent Publication No. 22862/1994 discloses technology according to which the center of the bottom which is not drawn or is little drawn is spherulited, a preform of which the center of the bottom portion and mouth-and-neck portion are spherulited, is biaxially stretch-blow-molded in order to draw the whole container, except the spherulited portions, at a high drawing ratio and, particularly, the semi-spherical bottom portion is drawn to reduce the thickness except the center of the bottom portion.

Concerning a method of producing a similar heat-resistant polyester bottle having round bottom, Japanese Laid-Open Patent Publication No. 122516/1988 discloses a method of producing PET bottles wherein a preform is heated at a drawing temperature, the primary blow-molding is effected to produce a primary bottle of a shape larger than a final product, the undrawn or little-drawn thick portions in the bottom of the primary bottle are preheated at a temperature of not lower than 150° C., the whole primary bottle is heat-treated in an atmosphere of a temperature of not lower than 150° C. to increase the crystallinity, the bottle is permitted to freely shrink to form a secondary bottle of a shape smaller than the final product, and the secondary blow-molding is effected in a metal mold having the shape of the final product thereby to obtain a bottle which is the final product.

A polyester bottle of a one-piece structure having pressure resistance, i.e., a petaloid-type bottle, has been proposed already. For example, Japanese Laid-Open Patent Publication No. 154535/1992 discloses a biaxially stretch-blow-molded bottle having a petaloid-type bottom in which a plurality of foot portions are swollen maintaining an equal distance and a valley wall is formed among the foot portions, wherein a central portion including an undrawn peripheral edge surrounding the central flat portion that includes the center of draw of the bottom, is crystallized in a manner that the outer side of the wall of the central portion has a density higher than that of the inner side thereof.

Moreover, Japanese Laid-Open Patent Publication No. 42586/1993 discloses a method of producing a synthetic resin bottle having a self-standing bottom by heat-shrinking the bottom portion only of the secondary article that is primarily blow-molded, followed by the secondary blow-molding.

Japanese Laid-Open Patent Publication No. 85535/1993 discloses a one-piece pressure-resistant self-standing container of which the center of the bottom is spherulited by heating, and further discloses an art wherein a preform of which the center of the bottom is spherulited is subjected to the primary blow-molding to obtain a secondary article having a thick portion that does not extend to the spherulited peripheral edge of the center of the bottom, and the secondary article is subjected to the secondary blow-molding to draw the article except the spherulited portion at the center of the bottom.

The container having a semispherical bottom portion of which the thickness is reduced by drawing exhibits excellent heat resistance and pressure resistance, and sufficiently withstands the heat-sterilization processing (which, legally speaking, is carried out at 65° C. for not less than 10 minutes) of when it is filled with a content such as carbonated beverage and hot water is poured thereon. There, however, exists such inconvenience that a base cup must be prepared separately from the container and must be attached to the container using adhesive or the like.

The self-standing container having a petaloid-type bottom, i.e., having a bottom molded with foot portions as a unitary structure, has an advantage in that there is no need to produce the base cup or to mount it accompanied, however, by a disadvantage in that the heat resistance is not yet satisfactory, i.e., heat resistance and pressure resistance are not yet satisfactory in the bottom portion. That is, in the container of this type, there necessarily exist undrawn or little-drawn thick portions. Under the condition where heat and pressure simultaneously act upon these portions, heat creeping deformation takes place to impair the self-standing ability of the container.

In forming the self-standing container having a bottom portion of the type in which foot portions are molded together as a unitary structure, when a preform of which the center of the bottom and the mouth-and-neck portion are spherulited, is subjected to the biaxial stretch-blow-molding at one time, it becomes difficult to reduce the thickness of the whole bottom portion under highly drawing conditions since the bottom portion has a complex shape. Therefore, little-drawn portions having relatively large thicknesses exist inevitably. The little-drawn portions having relatively large thicknesses exhibit inferior heat resistance or pressure resistance. When such a container is filled with the content and is subjected to the sterilization by heating, it becomes difficult to maintain self-standing ability.

The foot portions that impart self-standing ability to the container have been so formed as to protrude more toward the bottom than the valley portions located on the semispherical surface. Therefore, the foot portions tend to become thin and are often broken during the blow-molding, or lose strength against the pressurized content.

At the valley portions in the petaloid-type bottom and, particularly, at the center of the bottom of the heat-resistant and pressure-resistant bottle, a relatively large force acts thereon locally compared with the barrel portion. Accordingly, the valley portions and, particularly, the central portion in the bottom are deformed in a protruding manner, causing the container to lose self-standing ability and self-standing stability.

Furthermore, according to the method of the above-mentioned Japanese Laid-Open Patent Publication No. 85535/1993, the spherulited peripheral edge of the center of the bottom remains as an undrawn thick portion in the primarily blow-molded secondary article, and the thick portion is drawn by providing split bottom portions from the spherulited peripheral edge of the center of the bottom through the next secondary blow-molding. Even in the container of this type, however, there exists a limitation on the degree of drawing the vicinities of the center of the bottom during the secondary blow-molding. When used for the applications where heat resistance and pressure resistance are required, therefore, the container is deformed due to heat creeping at the time of sterilization by heating. In this case, the spherulited peripheral edge at the center of the bottom of the primarily blow-molded secondary article can be highly drawn to reduce the thickness by providing a spherulited region at the center of the bottom of the preform. It was, however, difficult to obtain a final product having good foot portions by further drawing the highly drawn portions on the bottom of the secondary article through the next secondary blow-molding.

According to the method of the above-mentioned Japanese Laid-Open Patent Publication No. 42586/1993, the thickness at the bottom of the container can be decreased compared with that of a single-stage stretch-blow molding. In the container of an embodiment thereof (FIG. 7, Table 1 of the publication), however, the thickness is 1.6 mm at the center of the bottom, and is still about 1.16 mm in the portions contiguous to the center of the bottom. Therefore, relatively little-drawn portions having a thickness of not smaller than 1 mm tends to remain on the circumference of the center of the bottom. Even the container of this type, therefore, tends to be deformed by heat creeping during the sterilization by heating.

SUMMARY OF THE INVENTION

It is therefore an object of the present invention to provide a biaxially drawn container of which the whole bottom portion has a reduced thickness owing to the drawing yet preventing the thickness of the foot portions from becoming too small, and which completely prevents the heat creeping phenomenon from occurring on the bottom portion during the sterilization by heating, and has excellent heat resistance, pressure resistance, shock resistance and self-standing ability in combination.

Another object of the present invention is to provide a container which can be favorably blow-molded, does not permit the ends of the foot portions to be locally drawn so much, maintains the thickness at the ends of the foot portions while preventing the whitening, maintains sufficient height of the foot portions during the heating, and exhibits improved heat resistance, pressure resistance and self-standing ability.

A further object of the present invention is to provide a method of mass-producing self-standing containers having a petaloid-type bottom, i.e., having a bottom portion with the foot portions formed integrally therewith, the bottom portion being homogeneously, highly uniformly and biaxially drawn, maintaining good reproduceability.

According to the present invention, there is provided a self-standing container having a mouth-and-neck portion, a shoulder portion, a barrel portion and a bottom portion that includes valley portions and foot portions obtained by biaxially stretch-blow-molding a resin and featuring excellent heat resistance and pressure resistance, wherein the whole container, except the mouth-and-neck portion, vicinities thereof and the center of the bottom portion, is reduced in thickness under a highly drawing condition without accompanied by whitening, and a portion constituting the bottom valley portions has an yielding load of not smaller than 25 kg/cm at 70° C.

In this container, it is desired that the whole container is crystallized to have a degree of crystallinity of not smaller than 20%, and the bottom portion is heat-set so that the bottom valley portions within a circle which is 50% of the barrel diameter $D_0$ have a degree of crystallinity of from 30 to 55%.

It is desired that the container has a thickness of from 0.15 to 1 mm except the mouth-and-neck portion, vicinities thereof and the center of the bottom portion, and has a thickness of from 0.3 to 1 mm in the bottom valley portions inclusive of the center of the bottom portion.

It is desired that the center of the bottom portion is spherulited and that the diameter of the spherulited portion is from 5 to 28% of the barrel diameter $D_0$. In this case, the spherulited portion has a thickness which is usually not smaller than 1 mm.

In the present invention, the container has a shape which produces the following features.

That is, the ratio $R_1/R_0$ of the radius $R_0$ of the barrel portion continuous to the bottom portion to the radius $R_1$ of curvature at the bottom valley portion of a generally spherical shape inclusive of the center of the bottom is from 1.3 to 2, and the diameter $D_1$ of the bottom valley portion of a roughly spherical shape having the radius $R_1$ of curvature is from 0.62 to 0.9 of the barrel diameter $D_0$;

the total surface area S' of the bottom valley portions within 40% of the barrel diameter $D_0$ is from 52% to 80% of the surface area $S_0'$ of the imaginary spherical surface of the bottom portion which is partly formed by the bottom valley portions within 40% of the barrel diameter $D_0$, and the total surface area S of the bottom valley portions within 80% of the barrel diameter $D_0$ is from 20% to 45% of the surface area $S_0$ of the imaginary spherical surface of the bottom portion which is partly formed by the bottom valley portions within 80% of the barrel diameter $D_0$;

the diameter $D_F$ of the root of foot portions at the center of bottom portion is from 22% to 35% of the barrel diameter $D_0$;

the foot opening angle θ including a valley portion is from 65° to 90° on a plane which leads to at least the ends of the foot portions, crosses the foot portions and is perpendicular to the valley portions;

the foot portions are continuous to the root portion at the center of the bottom portion by a curve which is not continuous to the valley portions, and a portion connecting the end of the foot portion to the root portion protrudes downwardly; and the bottom portion has a thickness of from 0.15 mm to 1 mm, the bottom valley portions have a thickness of from 0.3 mm to 1 mm, the radius $R_1$ of curvature near the center of the valley portion is from 1.3 to 2 times as great as the radius $R_0$ of curvature of the barrel portion, the total surface area S' of the bottom valley portions within 40% of the barrel diameter $D_0$ is from 52% to 80% of the surface area $S'_0$ of the imaginary spherical surface of the bottom portion which is partly formed by the bottom valley portion within 40% of the barrel diameter $D_0$, the total surface area S of the bottom valley portions within 80% of the barrel diameter $D_0$ is from 20% to 45% of the surface area $S_0$ of the imaginary spherical surface of the bottom portion which is partly formed by the bottom valley portions within 80% of the barrel diameter $D_0$, and the foot opening angle θ including a valley portion is from 65° to 90° on a plane which leads to at least the ends of the foot portions, crosses the foot portions and is perpendicular to the valley portions.

According to the present invention, furthermore, there is provided a method of producing a heat resistant and pressure resistant self-standing container in which the bottom portion includes a plurality of foot portions and valley portions, said valley portions forming part of a substantially semispherical surface, by blow-molding a cylindrical preform with bottom that is heated at a drawing temperature, said method comprising:

- a step for subjecting a preform to a biaxial stretch-blow-molding in a metal mold to obtain a secondary article in which a portion that should serve as the bottom portion of the final container has a surface area larger than the surface area of said semispherical surface, said secondary article further having a roughly dome-shaped bottom portion of a reduced thickness after being highly drawn except the center of the bottom portion;

- a step for facing the bottom portion of said secondary article and part of the barrel portion continuous to the bottom portion to the infrared-ray radiators and heat-shrinking the faced portions in order to obtain a tertiary article in which the portion that should serve as the bottom portion of the final container has a size that can be accommodated in said semispherical surface, and has a shape relatively close to that of the semispherical surface; and

- a step for secondarily blow-molding said tertiary article in a heated state in a metal mold in order to obtain the final product.

According to this method of production, it is particularly desired that:

- the bottom portion of the secondary article that is subjected to the primary blow-molding in the metal mold has a thickness of not larger than 1 mm and a degree of crystallinity of not smaller than 20% except the center of the bottom portion;

- a portion of the secondary article that should serve as the bottom of the final container has a surface area of 110 to 200% of the semispherical surface of the final container, and the diameter of the dome-shaped bottom of the secondary article is 1 to 1.3 times as great as the barrel diameter $D_0$ of the final product;

- the secondary article has a relatively small dent at the center in the dome-shaped bottom portion;

- a step is included in which the infrared-ray heating member is secured, the secondary article is passed therethrough while being rotated, the bottom portion of the secondary article and part of the barrel portion continuous to the bottom portion are heat-shrunk at 130 to 200° C. and are heat-set to obtain a tertiary article, and the portion of the tertiary article that should become the bottom portion of the final container has a surface area which is from 65 to 98% of the semi-spherical surface of the final product;

- a step is included in which the center of the bottom portion of the preform heated at a drawing temperature is held by a stretching rod inserted in the preform in the metal mold and by a pressing rod on the outside of the preform, a high-pressure gas is blown into the preform while driving the stretching rod to effect the biaxial stretch-blow-molding while suppressing the temperature drop at the center of the bottom portion within 40° C. before the drawing is finished, in order to obtain a secondary article having a roughly dome-shaped bottom portion of a reduced thickness inclusive of the center of the bottom portion as a result of a relatively high drawing ratio; and

- the tip of the stretching rod or the pressing rod is composed of a heat resistant plastic material or ceramic material having heat-insulating property, and is maintained at 60 to 130° C.

BRIEF DESCRIPTION OF THE DRAWINGS

FIGS. 3A, 3B, 3C, and 3D are diagrams of the bottom portion on an enlarged scale for explaining valley areas and other sizes in the bottom portion of the container of FIG. 1;

DETAILED DESCRIPTION OF THE INVENTION

Figure 1:
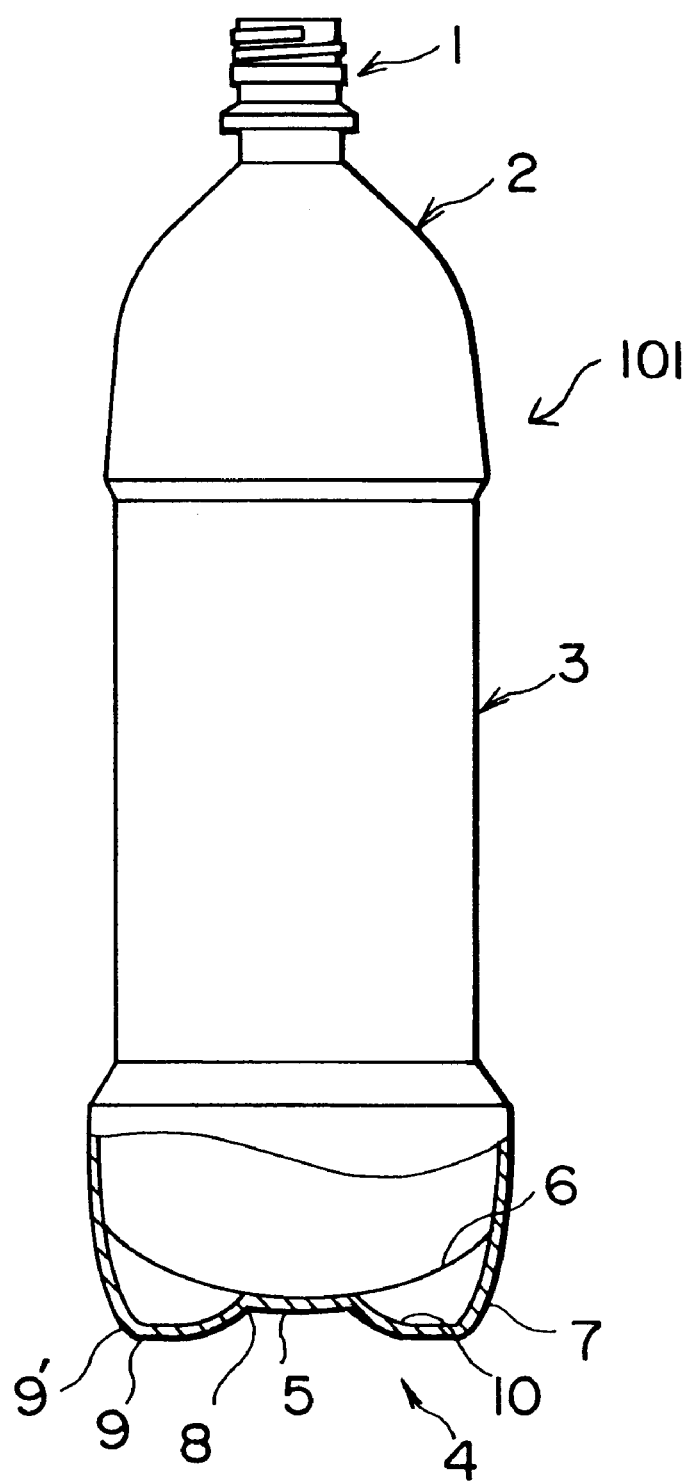
FIG. 1 is a side sectional view illustrating a portion of a heat resistant and pressure resistant self-standing container of the present invention.

Referring to FIG. 1 (side view partly in cross section) showing a heat resistant and pressure resistant self-standing container of the present invention, the container 101 has a mouth-and-neck portion 1, a shoulder portion 2, a barrel portion 3 and a bottom portion 4 formed by biaxially blow-molding a resin. The bottom portion 4 has at its center a bottom center 5 and further has in the periphery thereof a plurality of valley portions 6 and a plurality of foot portions 7 that are formed alternatingly. The valley portions 6 are located on the imaginary curved surfaces that are protruding toward the bottom, and foot portions 7 located among the valley portions 6 are protruding beyond the valley portions 6 toward the bottom. The foot portions 7 radially extend from the central root portion 8 and arrive at grounding portions 9 and curved end portions 9'.

Figure 4:
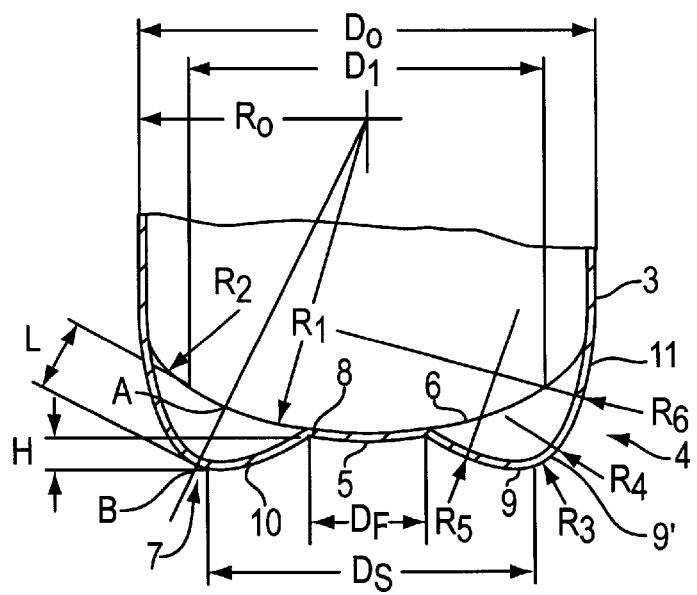
FIG. 4 is a sectional view illustrating on an enlarged scale major portions for explaining the sizes in the bottom portion of the container of FIG. 1.

Referring to FIG. 4 (sectional view illustrating major portions on an enlarged scale) for explaining the sizes in the bottom of the container, the barrel portion 3 just over the bottom portion of the container has a barrel diameter $D_0$, and the foot grounding portions 9 of the foot portions 7 have a grounding diameter Ds. The valley portion 6 has a radius $R_1$ of curvature near the bottom center 5 and a radius $R_2$ of curvature near the periphery of bottom, and the boundary of a generally spherical portion having the radius $R_1$ of curvature has a diameter $D_1$. The foot grounding portion 9 protrudes downwards and exists on or is continuous to the portion 9' that has a radius $R_3$ of curvature as well as a radius $R_4$ of curvature continuous thereto facing outwards. On this portion 9' (curved end portion) is positioned a toe portion B which is remotest by a distance L from the valley surface A. A portion 11 between the portion 9' including the toe portion B and the barrel portion 3 protrudes, too, downwardly and outwardly. This portion 11 has a radius $R_6$ of curvature. Generally, the radii of curvature satisfy a relationship $R_6>R_4>R_3$. Besides, a portion 10 between the foot grounding portion 9 and the root portion 8 is protruded downwardly and inwardly, and includes a cross section of which the radius of curvature is roughly $R_5$. A gap having a foot height H is maintained between the foot grounding portion 9 and the bottom center 5.

Figure 3A:
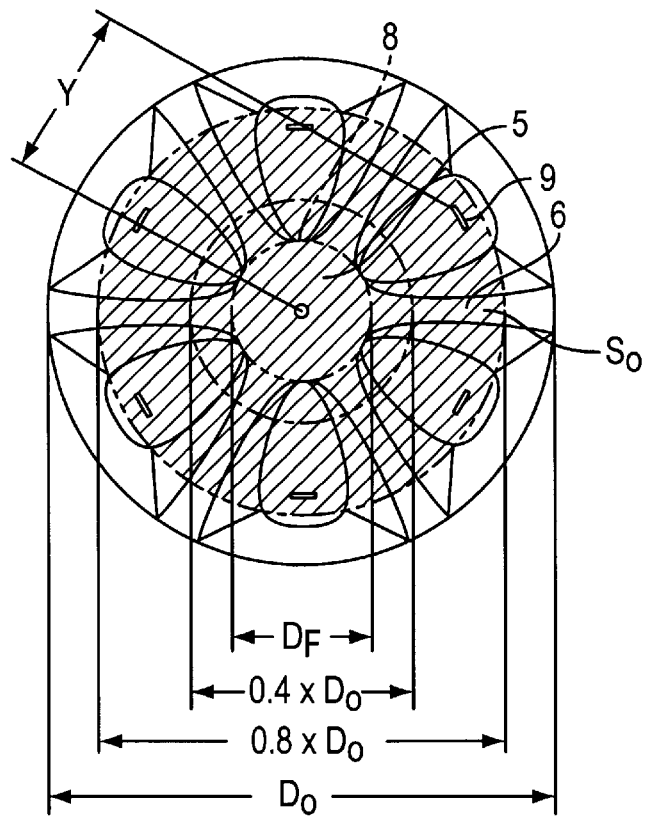
Figure 3B:
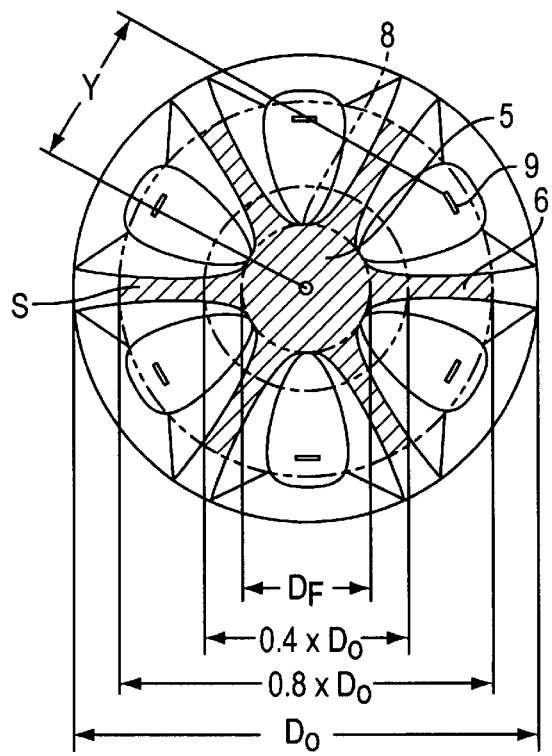
Figure 3C:
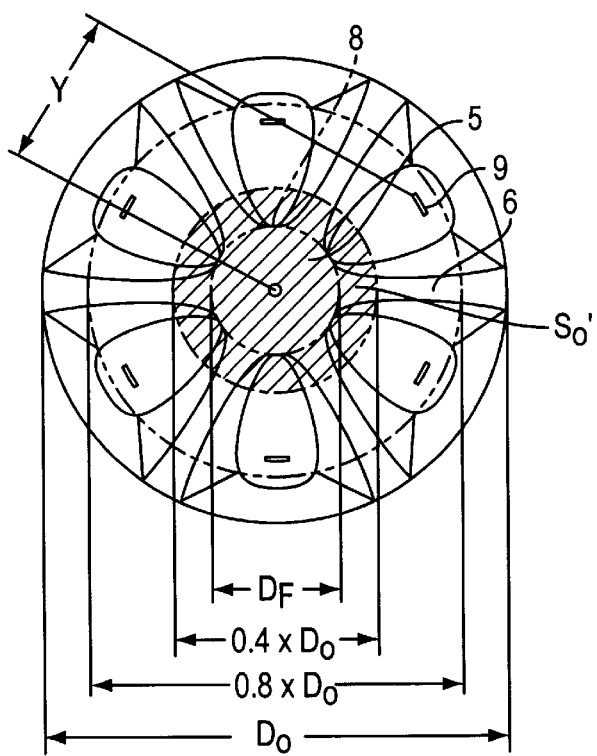

Referring to FIG. 3 (enlarged bottom view) illustrating the areas of valleys 6 on the bottom 4 of the container and other sizes, a circle is drawn having a diameter ($0.8 \times D_0$) which is 80% of the barrel diameter $D_0$ from the center of the bottom, the surface area of the whole imaginary sphere included in this circle is denoted by $S_0$ (hatched in FIG. 3A), and the surface area of the valley portions (inclusive of bottom center 5) in the circle is denoted by S (hatched in FIG. 3B). Similarly, a circle is drawn having a diameter ($0.4 \times D_0$) which is 40% of the barrel diameter $D_0$ from the center of the bottom, the surface area of the whole imaginary sphere included in this circle is denoted by $S'_0$ (hatched in FIG. 3C), and the surface area of the valley portions 6 (inclusive of bottom center 5) in the circle is denoted by S' (hatched in FIG. 3D). Furthermore, a circle is drawn passing through the root portion 8 of the foot portions. The diameter of this circle is denoted by $D_F$.

Figure 5:
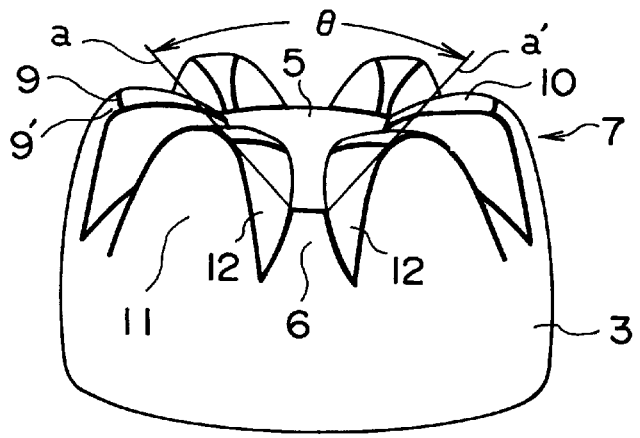
FIG. 5 is a perspective view of the bottom portion illustrating in detail the valley portions and foot portions on the bottom of the container of FIG. 1, and the foot opening angle.

Referring to FIG. 5 (perspective view of the bottom portion) illustrating in detail the arrangement of valley portions and foot portions on the bottom portion of the container and the foot opening angle, the valley portions 6 are located on the imaginary sphere that protrudes toward the bottom portion but the foot portions 7 and, particularly, the curved end portions 9' inclusive of the grounding portions 9 protrude downwards (toward the grounding direction) via a tilted portion 12. In the present invention as shown in FIG. 5, the foot opening angle θ between two foot portions is defined between a line a that connects one end of the valley portion 6 to an end of the corresponding foot portion 7 and a line a' that connects the other end of the valley portion 6 to the end of the corresponding foot portion 7 on a plane that crosses the neighboring foot portions 7, 7 and is perpendicular to the valley portion 6.

The self-standing container of the present invention has the mouth-and-neck portion 1, shoulder portion 2, barrel portion 3, and bottom portion 4 that includes a plurality of valley portions 6 and foot portions 7, formed by biaxially stretch-blow-molding a resin, and has a feature in that the container as a whole is substantially transparent without whitening except the mouth-and-neck portion 1, vicinities thereof and the bottom center, and has a reduced thickness being highly drawn, and has an yielding load at portions constituting the valley portions 6 of not smaller than 25 kg/cm and, preferably, not smaller than 30 kg/cm at 70° C.

Figure 6:
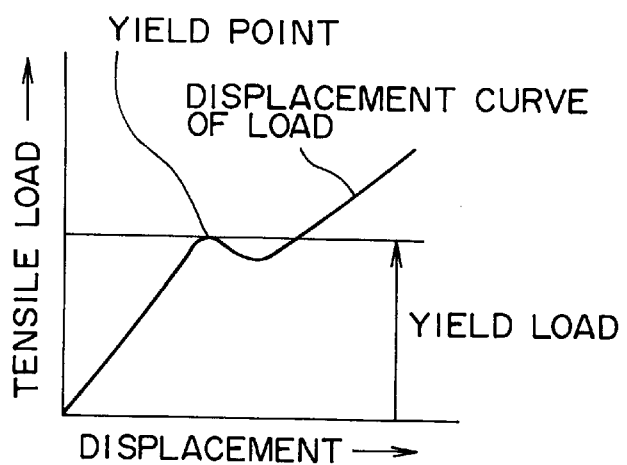
FIG. 6 is a graph explaining the method of measuring the yielding load.

Referring to a graph of FIG. 6 for explaining the method of measuring the yielding load, the abscissa represents the displacement and the ordinate represents the tensile load. When a sample obtained from the valley portion of the container is subjected to the tensile testing, an yielding point (generally, a peak or a shoulder on a curve) appears following the elastic deformation. Therefore, the load that corresponds to the yielding point can be found as a load per a unit width of the sample.

Figure 7:
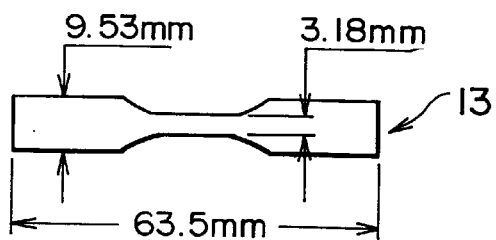
FIG. 7 is a diagram explaining the sizes of a dumbbell-type sample used for measuring the yielding load.

FIG. 7 shows the sizes of a dumbbell-type sample 13 used for measuring the yielding load.

In the valley portions 6 and, particularly, at the bottom center 5 of the petaloid-type bottom portion, a relatively large force locally acts thereon compared with the barrel portion 3. Therefore, these portions undergo a creep deformation accounting for a major cause of loss of self-standing ability.

In the present invention, the portions constituting the valley portions 6 have an yielding load at 70° C. of not smaller than 25 kg/cm and, preferably, not smaller than 30 kg/cm, in order to obtain a self-standing container having a bottom portion that exhibits excellent heat resistance and pressure resistance.

In order to obtain a bottom having the above-mentioned yield strength without whitening, it is important that the whole bottom is highly drawn to have a suitably reduced thickness.

It is desired that the valley portions 6 inclusive of the bottom center 5 has a thickness of from 0.3 to 1 mm and, particularly, from 0.4 to 0.8 mm.

With the bottom being relatively highly drawn to have a reduced thickness, the yield stress strikingly increases at a temperature of around 70° C. at which the sterilization is effected. When the drawing degree and the reduction of thickness are excessive, however, the yielding load which is a strength per a unit width of the bottom portion rather decreases. It is therefore desired that the valley portions inclusive of the bottom center has a thickness of not smaller than 0.3 mm.

On the other hand, in the bottom valley portions having a relatively large thickness of not smaller than 1 mm, the degree of drawing decreases and the yield stress greatly decreases. Therefore, when the portions having a thickness in excess of 1 mm exist over relatively wide areas, the yielding load at 70° C. becomes smaller than a preferred range of the present invention and the valley portions undergo a deformation to a large degree during the heat-sterilization process.

The yielding load at 70° C. can be increased by heat-crystallizing, i.e., by spheruliting the thick portions. However, when the thick portions that exist over a relatively wide area are heated and crystallized until a desired yielding load is obtained, there easily takes place the whitening. The whitened portions bring about such problems as poor appearance and decreased shock resistance due to brittleness.

When the spherulited thick portions exist, particularly, at the bottom center, on the other hand, the container exhibits desired heat resistance and pressure resistance without almost no drop in the shock resistance as far as the spherulite has a very small diameter, and the yielding load at the valley portions lie within a range of the present invention. In this case, therefore, the container can be used as a heat resistant and pressure resistant self-standing container.

Even when there exist thick portions having thicknesses in excess of 1 mm, desired heat resistance and pressure resistance are obtained if their area is limited like along a ring-like region of a width of not larger than several millimeters around the center of the bottom instead of at the center of the bottom so far as the yielding load of the valley portions inclusive of thick portions lie within a range of the present invention.

When it is attempted to improve the heat resistance and pressure resistance by enhancing the degree of crystallinity by heating the bottom portion that includes narrow ring-like thick portions around the center of the bottom portion, the temperature rise at thin portions around the ring-like thick portions exceeds the temperature rise of the thick portions due to a difference in the heat capacity. Even under the heating condition in which the thick portions are not whitened, therefore, the peripheral thin portions are more crystallized making it possible to further increase the strength.

When the center of the bottom portion has a large thickness, it is desired to spherulite the center of the bottom portion by heating. It is, particularly, desired to spherulite the bottom portion in the stage of the preform. Limitation exists in the size of the spherulited portions at the center of the bottom portion from the standpoint of heat resistance, pressure resistance, shock resistance and moldability. It is desired that the diameter $D_C$ of the spherulited portions is not larger than 90% and, particularly, not larger than 80% of the diameter $D_F$ of the root portion of the bottom center, and is from 5 to 28% of the maximum barrel diameter $D_0$ of the container. It is further desired that this portion has a degree of crystallinity of from 25 to 55% from the standpoint of heat resistance, creeping resistance, and highly drawing the portions other than the spherulited portions.

According to the present invention, the bottom portion that is highly drawn to have a reduced thickness except the center of the bottom portion is heat-set and is crystallized, making it possible to further improve heat resistance and pressure resistance. In this case, the bottom portion that is highly drawn to have a reduced thickness is heat-set at a temperature of about 130° C. to 200° C. and is, hence, crystallized without almost being whitened. Accordingly, a sufficient degree of shock resistance is obtained. It is important by heat-setting the bottom portion to increase the degree of crystallinity of the spherical surfaces on the bottom portion within a diameter which is about 50% of the barrel diameter. It is desired that such portions have a degree of crystallinity of 30 to 55%. It is therefore desired that the container as a whole has a degree of crystallinity of not smaller than 20% and has a thickness over a range of from 0.15 to 1 mm except the mouth-and-neck portion, vicinities thereof and the center of the bottom portion.

The self-standing container according to another embodiment of the present invention has the mouth-and-neck portion 1, shoulder portion 2, barrel portion 3, and bottom portion 4 that includes a plurality of valley portions 6 and foot portions 7, and is obtained by biaxially stretch-blow-molding a resin. Here, the feature resides in that the container as a while is highly drawn to have a reduced thickness except the mouth-and-neck portion 1 and the vicinities thereof, that the overturning angle of the container is not smaller than 10°, and that the ratio $Y/R_0$ of the radius $R_0$ of the barrel portion continuous to the bottom portion to the distance Y from the center of the bottom portion to the grounding portion, lies within a range of from 0.6 to 0.7.

Figure 2:
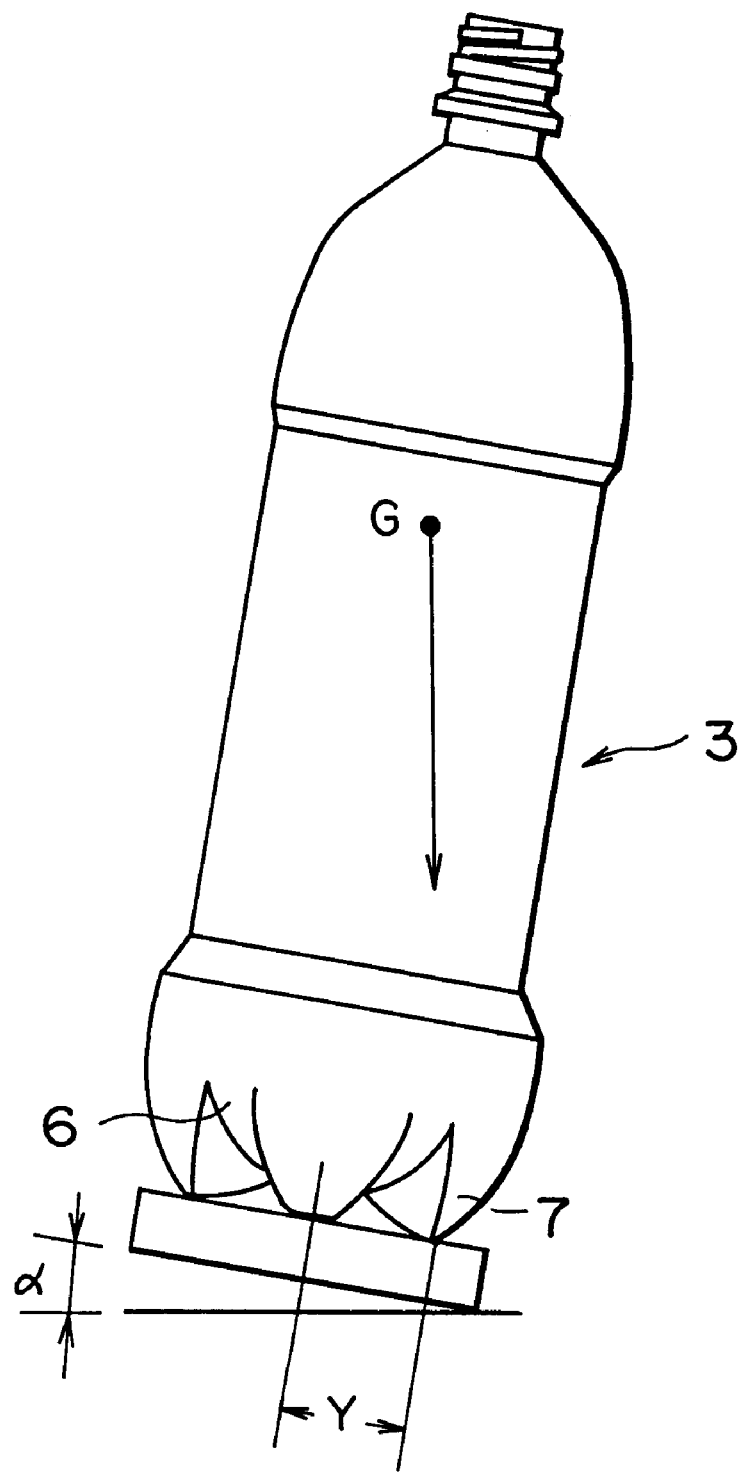
FIG. 2 is a diagram illustrating an overturning angle of an empty container.

In general, the self-standing containers having relatively large lateral-to-vertical ratios (L/D) involve a problem of overturning when the empty containers are being conveyed on a line for pouring the content. As shown in FIG. 2, therefore, it is desired that the empty containers have an overturning angle α of not smaller than 10° so that they are not overturned.

In the container of the present invention having the bottom portion of a reduced thickness, the center of gravity (G in FIG. 2) becomes higher than that of when the bottom portion as a whole has a large thickness, which is disadvantageous from the standpoint of preventing overturn.

According to the present invention, it was learned that the overturning angle α of the empty container can be set to be not smaller than 10° by:

a) selecting the number of foot portions 7 to be from 6 to 4 and, particularly preferably, from 6 to 5; and b) selecting the diameter and width of the grounding portion 9 so that the ratio $Y/R_0$ of the radius $R_0$ of the barrel portion continuous to the bottom portion to the distance Y from the center of the bottom portion to the line connecting the grounding portions 9, is from 0.66 to 0.8 (FIGS. 2 and 3).

This is particularly effective for the containers having a lateral-to-vertical ratio (L/D) of not smaller than 3.1.

In order to obtain a distance Y over the above-mentioned range, it is desired that the ratio $D_S/D_0$ of the barrel diameter $D_0$ to the diameter $D_S$ of the grounding portion is from 0.66 to 0.8 (FIG. 4).

When the bottom portion as a whole is relatively highly drawn to have a reduced thickness and when the diameter and width of the grounding portion are selected to be relatively large to maintain a large overturning angle, the ends of the foot portions, i.e., the outer side of the grounding portions 9 become very thin, resulting in the occurrence of whitening when drawn excessively.

According to the present invention, the bottom shape of the container is contrived to improve moldability by solving the above-mentioned problems. That is, the container which is not substantially whitened by over-drawing at the curved end portions 9' is obtained by selecting the thickness near the curved end portions 9' to be not smaller than 0.15 mm and, preferably, not smaller than 0.2 mm.

In order to maintain moldability at the ends of the foot portions according to the present invention, the distance L from the valley surface A to the end B of foot portion is decreased within a range that does not impair the heat resistance and pressure resistance (FIG. 4).

To obtain heat resistance and pressure resistance, the valley portions 6 inclusive of the bottom center 5 are constituted by one or a plurality of spherical surfaces or roughly spherical surfaces that include a rotary oval surface, and are, preferably, constituted by a spherical surface having a radius $R_1$ of curvature including the bottom center 5 and a spherical surface having a radius $R_2$ of curvature continuous to the barrel portion.

Here, the radius $R_1$ of curvature of the spherical surface inclusive of the bottom center 5 is set relatively largely, and a valley portion A corresponding to a distance L between the end of foot portion and the valley surface is included in the spherical surface, so that the distance L becomes relatively small between the end of foot portion and the valley portion. This helps improve blow moldability at the end of the foot portion. Accordingly, the ends of the foot portions can have a relatively large thickness and escape from whitening and over-drawn.

The heat resistance and pressure resistance decrease at the valley portions with an increase in the radius $R_1$ of curvature of the spherical surface. By the shape of the bottom portion for improving the heat resistance and pressure resistance of the present invention, however, it is allowed to maintain desired heat resistance and pressure resistance despite the radius $R_1$ of curvature is relatively large.

Concretely speaking, it is desired to select the ratio $R_1/R_0$ of the radius $R_0$ of the barrel portion to the radius $R_1$ of curvature of the roughly spherical surface constituting the bottom center 5 to be from 1.3 to 2, and to set the ratio $D_1/D_0$ of the barrel diameter $D_0$ to the diameter $D_1$ representing the range of the spherical surface to be from 0.62 to 0.9.

When the ratio $R_1/R_0$ exceeds 2, the heat resistance and pressure resistance decrease at the valley portions, and it becomes difficult to maintain self-standing ability of the container after it is filled with content and is sterilized by heating.

When the ratio $R_1/R_0$ becomes smaller than 1.3, the distance L becomes too great between the end of the foot portion and the valley portion, and it becomes difficult to maintain a desired thickness at the ends of the foot portions.

It is desired that the curved end portion 9' of the foot portion 7 includes the grounding portion 9 or is connected to the grounding portion 9, and is constituted by two synthesized curved surfaces having a radius $R_3$ including the end B of foot portion and a radius $R_4$. It is further desired that the curved end portion 9' is continuous to the barrel portion 3 via an outer curved portion 11 having a radius $R_6$.

In this case, a desired thickness can be maintained at the ends of the foot portions and a desired foot-shape imparting ability can be obtained by setting relatively small the radius $R_3$ of curvature that includes the grounding portion 9 or is close thereto, setting the radius $R_4$ of curvature to be larger than $R_3$, and connecting it to a large radius $R_6$ of curvature thereby to decrease the distance L between the end of the foot portion and the valley surface. That is, when the curved end portion 9' is constituted by a single curve having a relatively large radius $R_4$, the distance L becomes too great between the end of the foot portion and the valley surface making it difficult to maintain thickness at the end of the foot portion. On the other hand, when the curved end portion 9' is constituted by a single curved surface having a relatively small radius $R_3$ of curvature and is directly connected to an outer curved portion 11 having a large radius $R_6$ of curvature by using a metal mold, shape-imparting ability decreases at the end of the foot portion after the blow molding, the radius $R_3$ of the product becomes larger than that of the metal mold, and the shape of the grounding portion 9 is not reproduced. As a result, the diameter $D_S$ of the grounding portion 9 becomes small, and the container tends to be easily overturned. Desirably, therefore, the curved end portion 9' is constituted by a curved surface which in cross section has two dissimilar radii $R_3$ and $R_4$ of curvature.

Concretely speaking, it is desired that the radius $R_3$ of curvature is from 2 to 8 mm and the radius $R_4$ of curvature is not smaller than 8 mm.

When the radius $R_3$ of curvature becomes smaller than 2 mm or the radius $R_4$ of curvature becomes smaller than 8 mm, the shape-imparting ability at that portion is deteriorated during the blow-molding and it becomes difficult to obtain desired foot portions and, particularly, the diameter $D_S$ of the predetermined grounding portion.

In the container of the present invention by taking into consideration the overturning of the container and moldability of the foot portions, it is important to maintain heat resistance and pressure resistance by contriving the shape of the bottom portion in addition to highly drawing the whole bottom portion so as to have a large strength at high temperatures and a reduced thickness.

The valley portions featuring excellent heat resistance, pressure resistance and foot moldability have the following constitution.

a) The bottom center 5 and vicinities thereof to where the greatest force acts are formed in a roughly spherical shape, and the root portion from where the foot portions grow at the center of the bottom portion has a relatively large diameter $D_F$ (FIG. 4).

Concretely speaking, it is desired that the ratio $D_F/D_0$ of the barrel diameter $D_0$ to the diameter $D_F$ at the root of the foot portion is from 0.22 to 0.35.

When the ratio $D_F/D_0$ becomes smaller than 0.22, the areas of valley portions near the center of the bottom portion become small, and the center of the bottom portion deforms to a large extent.

When the ratio $D_F/D_0$ exceeds 0.35, on the other hand, the bottom portion that can be utilized for forming the foot portions during the blow-molding is limited to the peripheries of the article, making it difficult to maintain a desired thickness at the ends of the foot portions.

b) Heat resistance and pressure resistance are maintained by forming, in a relatively large width, the center 5 of the bottom portion and the valley portions in the vicinities thereof to where the greatest deforming force acts (FIG. 4).

Concretely speaking, the ratio $S'/S'_0$ of the surface area $S'_0$ of an imaginary spherical surface constituted by the valley portions only to the surface area $S'$ of the valley portions within 40% of the barrel diameter $D_0$ is selected to be from 0.52 to 0.8 and, preferably, from 0.6 to 0.75.

When the ratio $S'/S_0'$ becomes smaller than 0.52, the areas of the center of the bottom portion and valley portions in the vicinities thereof become small, the center of the bottom portion tends to be deformed to a large extent, and it becomes difficult to maintain self-standing ability of the container.

When the ratio $S'/S_0'$ exceeds 0.8, on the other hand, only limited portions are utilized for forming the foot portions during the blow-molding, and it becomes difficult to maintain a desired thickness at the ends of the foot portions.

c) Thickness at the ends of the foot portions are maintained by forming in a relatively small width the valley portions in the periphery of the bottom portion including valley portions A that correspond to the ends B of the foot portions.

Concretely speaking, the ratio $S/S_0$ of the surface area $S_0$ of the imaginary spherical surface constituted by the valley portions only to the surface area $S$ of the valley portions within 80% of the barrel diameter $D_0$ is selected to be from 0.2 to 0.45 and, preferably, from 0.25 to 0.4.

When the ratio $S/S_0$ becomes smaller than 0.2, the width near the valley portion A becomes too narrow, and the heat resistance and pressure resistance decrease conspicuously.

When the ratio $S/S_0$ exceeds 0.45, on the other hand, the width near the valley portion A becomes too broad, and only limited portions are utilized for forming the foot portions during the blow-molding, making it difficult to maintain a desired thickness at the ends of the foot portions.

d) It is desired to decrease as much as possible the transfer of deforming force from the foot portions to the center of the bottom portion by forming in a relatively narrow width the connection portions between the root portion 8 of foot portions and the center 5 of the bottom portion.

Concretely speaking, it is desired that the end of the root portion 8 of foot portions at the center of the bottom portion is formed in a curved shape (FIG. 3).

e) It is desired that the foot opening angle θ including a valley portion is from 65° to 90° on a plane which crosses the foot portions, directed toward the ends B of the foot portions and is perpendicular to the valley portions (FIG. 5).

When the container has a foot opening angle θ which is smaller than 65°, then, the foot opening angle θ becomes large after the content is poured and is sterilized by heating. Accompanying thereto, therefore, the valley portions are deformed in large amounts.

Increasing the foot opening angle θ can be regarded to bringing close to the direction of the spherical surface the direction of the force that so acts upon the valley portions constituted by part of the spherical surface as to pull up the foot portions. This helps decrease the component of power acting perpendicularly to the spherical valley portions, i.e., decrease the component of power that deforms the valley portions. By increasing the foot opening angle θ, therefore, it is allowed to decrease deformation of the valley portions and to greatly improve heat resistance and pressure resistance.

By selecting a relatively large foot opening angle θ, furthermore, the force acts in a direction which is advantageous from the standpoint of molding the foot portions. That is, with the foot opening angle θ being increased, the surface areas of the foot portions decrease relatively, and the amount of draw at the foot portions is suppressed.

When the foot opening angle θ becomes too great, on the other hand, the width of the grounding portions at the ends of the foot portions become small. As the grounding portions at the ends of the foot portions become too narrow, the empty container tends to become easily overturned particularly before it is being filled with the content, which is not desirable. It is therefore desired that the foot opening angle θ is not larger than 90°.

f) The initial foot height H is selected to be from 2 to 8 mm and, preferably, from 3 to 6 mm.

When the foot height H is smaller than 2 mm, the foot height becomes very small when the valley portions at the center of the bottom portion are deformed after the content is poured and is sterilized by heating, or the center of the bottom portion rather protrudes downwards beyond the foot portions, making it difficult to maintain self-standing ability of the container.

When the foot height H exceeds 8 mm, on the other hand, the distance L becomes too great between the end B of the foot portion and the valley portion A, making it difficult to maintain a desired thickness at the ends of the foot portions.

g) It is desired that the foot portion is formed in a shape in which the foot portion at the root portion 8 at the center of the bottom portion is continuous through a discrete curve to the valley portion formed by a spherical surface, and a portion 10 connecting the root portion 8 to the grounding portion 9 protrudes downwards. Desirably, the protrusion includes an arc which in cross section has nearly the radius $R_5$ of curvature which is from 10 to 60 mm.

In a pressure resistant container having a petaloid-type bottom portion, in general, stress concentrates near the root portion of foot portions at the center of the bottom. When the foot portion is continuous to the valley portion through a discrete curve in the conventional bottom portion which has a large thickness being little drawn, defects such as stress and crack easily develop due to the concentration of excess stress at such portions.

In the container of the present invention in which the whole bottom portion is relatively highly drawn to increase the strength, it was learned that the above-mentioned defects do not at all occur and favorable shock resistance is obtained even when the foot portion is continuous to the valley portion through a discrete curve.

In a step of blow-molding the petaloid-type bottom portion, in general, the molded article first comes at the bottom center and the valley portions into contact with the metal mold, and the contacting position spreads in the direction of ends of the foot portions. In the stage of blow-molding, a portion of the molded article which has once come into contact with the metal mold is locked by the metal mold and is cooled, and is not hence highly drawn in a subsequent step. In the stage of blow-molding, when the contacting areas between the metal mold corresponding to the foot portions and the molded article are successively shifted from the center of the bottom to the peripheral portion, the ends of the foot portions are locally drawn to an excess degree and the thickness may often become very small. This could become a problem particularly in a container of which the bottom portion is relatively highly drawn to have a reduced thickness.

According to the present invention, the bottoms of the foot portions are protruded and the foot portions are continuous to the valley portions through a discrete curve, so that the molded article arrives being slightly delayed in time at the metal mold that corresponds to the bottom surfaces of foot portions near the center of the bottom portion in the stage of blow-molding. This makes it possible to prevent the ends of the foot portions from locally drawn to an excess degree. As a result, it is allowed to suppress the drawing at the ends of the foot portions and to maintain a favorable thickness at the ends of the foot portions.

In the present invention, furthermore, the protruded shape of bottom surfaces of the foot portions have a length larger than that of the linear shape and undergo a relative deformation to a large degree after the content is poured and is sterilized by heating. Besides, the foot height H which is a distance between the center of the bottom portion and the grounding portions of foot portions changes in a direction to increase. This makes it possible to improve the heat resistance and pressure resistance.

In the present invention, any plastic material can be used provided it is capable of being stretch-blow-molded and is heat-crystallized. Advantageously, there can be used thermoplastic polyesters and, particularly, ethylene terephthalate-type thermoplastic polyester. It is allowable to use a polycarbonate and an acrylate resin, as a matter of course.

In the ethylene terephthalate-type thermoplastic polyester used in the present invention, most of the ester recurring unit and, generally, not smaller than 70 mol % and, particularly, not smaller than 80 mol % of the ester recurring unit is occupied by an ethylene terephthalate unit. Desirably, the thermoplastic polyester has a glass transition point (Tg) of from 50 to 90° C. and, particularly, from 55 to 80° C., and a melting point (Tm) of from 200 to 275° C. and, particularly, from 220 to 270° C.

A homopolyethylene terephthalate is favorable from the standpoint of heat resistance and pressure resistance. It is, however, also allowable to use a copolymerizable polyester containing small amounts of ester units other than the ethylene terephthalate unit.

Examples of the dibasic acid other than the terephthalic acid include aromatic dicarboxylic acid such as isophthalic acid, phthalic acid or naphthalene dicarboxylate; alicyclic dicarboxylic acid such as cyclohexane dicarboxylate; aliphatic dicarboxylic acid such as succinic acid, adipic acid, sebacic acid or dodecane dioic acid, which may be used in one kind or in a combination of two or more kinds.

Examples of the diol component other than the ethylene glycol include propylene glycol, 1,4-butane diol, diethylene glycol, 1,6-hexylene glycol, cyclohexane dimethanol, ethylene oxide adduct of bisphenol A, which may be used in one kind or in a combination of two or more kinds.

It is further allowable to use a composite material of the ethylene terephthalate-type thermoplastic polyester blended with about 5% to about 25% of a polyethylene naphthalate, polycarbonate or polyarylate having a relatively high glass transition point, so that the material exhibits an increased strength when it is heated at relatively high temperatures.

It is further allowable to use the polyethylene terephthalate and the above-mentioned material having a relatively high glass transition point in a form laminated one upon the other.

The ethylene terephthalate-type thermoplastic polyester that is used should have a molecular weight at least large enough for forming a film. Depending upon the applications, the ethylene terephthalate-type thermoplastic polyester is used in an injection grade or in an extrusion grade. It is desired that the ethylene terephthalate-type thermoplastic polyester has an inherent viscosity (I.V.) of generally from 0.6 to 1.4 dL/g and, particularly, from 0.63 to 1.3 dL/g.

According to the present invention, the container is produced by the biaxial stretch-blow-molding using a metal mold.

As a biaxial stretch-blow-molding means, there can be adapted a single-stage blow-molding method for obtaining a final product from the preform through one time of blow-molding using the metal mold. Preferably, furthermore, there can be employed a two-stage blow-molding method in which an intermediate article is obtained from the preform through the primary blow-molding, and the intermediate article is subjected to a secondary blow-molding to obtain a final product.

In producing the container of the present invention having a bottom portion which is highly drawn to have a reduced thickness, it is important to employ a biaxially stretch-blow-molding method which highly draws the bottom portion to reduce its thickness so as to impart a large strength. It is possible to produce the container of the present invention by a single-stage blow-molding based upon the method of the invention. With the single-stage blow-molding method, however, thick portions which are relatively little drawn are locally formed in the petaloid-type bottom portion that has a complex shape and, hence, considerable limitation is imposed on the shape of the bottom portion. Or, a relatively long blow-molding time is required since the bottom portion is heat-set by the metal mold, causing the efficiency for producing containers to decrease.

The present inventors therefore have advanced the art in order to produce the containers by the two-stage blow-molding method by obtaining a secondary article having a bottom portion of a shape that can be easily drawn by a primary blow-molding, heat-shrinking the secondary article, and subjecting the secondary article to a secondary blow-molding to obtain a final product. The inventors have found through the study that in the two-stage blow-molding method, the portions that are once highly drawn by the blow-molding are highly oriented and crystallized, and are little suited for being drawn again, arousing a problem in conducting the secondary blow-molding.

The inventors have found through extensive study that the bottom portion can be subjected to the drawing to a relatively high degree during the secondary blow-molding by forming the bottom portion of the secondary article in a roughly dome-shape, by relatively highly drawing the bottom portion of the secondary article by the primary blow-molding so as to have a reduced thickness, by shrinking the bottom portion of the secondary article and part of the barrel portion continuous to the bottom portion by non-contact heating without locking them to obtain a tertiary article, by forming the heated bottom of the tertiary product in a shape which is close to the shape of the valley portions of the final product as much as possible, and by permitting the heated portions of the secondary article to have relatively large surface areas to meet the heat-shrinking of when the tertiary article is obtained. The inventors have further found that when the bottom portion of the tertiary article is heated at a temperature of from 130 to 200° C., the secondary blow-moldability is improved and, as a result, the container of the present invention is formed being highly drawn by the secondary blow-molding to have a reduced thickness of the bottom portion.

Relying upon the two-stage blow-molding method according to the present invention, a cylindrical preform with bottom heated at a drawing temperature is blow-molded, and a heat resistant and pressure resistant self-standing plastic container is produced having a bottom portion that includes a plurality of foot portions and valley portions, the valley portions substantially forming part of a semispherical surface. Here, the molding is carried out relying upon the combination of a step (primary blow-molding step, FIGS. 8 and 9) for subjecting a preform to a biaxial stretch-blow-molding in a metal mold to obtain a secondary article in which a portion that serves as the bottom portion of the final container has a surface area larger than the surface area of said semispherical surface of the final container, and said secondary article further having a roughly dome-shaped bottom of a reduced thickness being highly drawn except the center of the bottom portion; a step (heat-treating step, FIGS. 10 and 11) for facing the bottom portion of said secondary article and part of the barrel portion continuous to the bottom portion to the infrared-ray radiators and heat-shrinking the faced portions in order to obtain a tertiary article in which the portion that serves as the bottom portion of the final container has a size that can be accommodated in said semispherical surface, and has a shape relatively close to that of the semispherical surface; and a step (secondary blow-molding step, FIGS. 12 and 13) for secondarily blow-molding said tertiary article in a heated state in a metal mold in order to obtain a final product.

In forming the preform using a metal mold, in general, the bottom center of the molded article remains being little drawn and having a large thickness. According to the present invention, the preform is subjected to the primary blow-molding while pushing the bottom portion of the preform using an internal stretching rod and an external pressing rod. Therefore, the pushed portion and the vicinities thereof are cooled and are little drawn to have a large thickness. However, the peripheries thereof are relatively highly drawn to acquire a reduced thickness.

At this moment, it is desired that the shoulder portion connected to the mouth-and-neck portion is also highly drawn to acquire a reduced thickness from the standpoint of maintaining heat resistance and pressure resistance.

The little-drawn thick portion at the center of the bottom portion remains until the final container is obtained and exhibits poor heat resistance and creep strength. When the little-drawn thick portion has a relatively small size, however, the drop of heat resistance and creep resistance is confined only locally, and the heat resistant and pressure resistant self-standing container can be used without any problem.

In the present invention, it is desired that the bottom center and the mouth-and-neck portion of the preform are spherulited in advance in order that the bottom portion and the shoulder portion can be stably and highly drawn to acquire a reduced thickness in the primary blow-molding. That is, in the primary blow-molding, the drawing point is fixed to a spherulited edge at the center of the bottom portion, enabling the bottom portion to be drawn to a high degree and uniformly except the spherulited portions. The shoulder portion connected to the spherulited mouth-and-neck portion can also be drawn in the same manner.

In the thus obtained container of which the center of the bottom portion is spherulited, the center of the bottom portion exhibits excellent heat resistance and creep strength, the peripheral edge thereof is highly drawn to acquire a reduced thickness and is, hence, highly oriented and crystallized. Through the subsequent heat treatment, furthermore, the bottom portion is crystallized to exhibit excellent heat resistance and creep strength. Thus, the bottom portion as a whole exhibits markedly improved heat resistance and creep strength.

In the self-standing container in which foot portions and valley portions are alternatingly formed on the periphery of the bottom portion, the foot portions downwardly protrude as a matter of course. Therefore, the thickness of the foot portions only tend to be reduced excessively. During the blow-molding or when the content that spontaneously produces pressure is poured and is sterilized by heating, therefore, the foot portions tend to be broken. According to the present invention, however, the bottom portion other than the limited center of the bottom is drawn to form foot portions. That is, the thickness of the foot portions is prevented from becoming very small and, thus, the bottom portion exhibits increased pressure resistance and strength.

According to the present invention, in fact, the drawing can be effected to such a high degree that the bottom portion has a thickness of not larger than 1 mm and, particularly, not larger than 0.8 mm other than the center of bottom portion yet maintaining the thickness of not smaller than 0.15 mm and, particularly, not smaller than 0.2 mm at the ends of the foot portions that tend to lose thickness most conspicuously among the foot portions. When a little-drawn portion having a thickness of larger than 1 mm remains in the portions other than the center of the bottom portion, the container loses heat resistance and pressure resistance. When the content is poured and is sterilized by heating, furthermore, the thick portions in the bottom portion undergo a deformation to lose self-standing ability. When the thickness of the end of the foot portions become smaller than the above-mentioned ranges, furthermore, the bottom portion loses pressure resistance and strength causing the container to be ruptured.

In the present invention, the valley portions of the final container are subjected to the primary blow-molding for obtaining the secondary article and to the heat treatment for obtaining the tertiary article with the spherical surface forming part of the valley portions as a reference. In the primary blow-molding, the portion that should become the bottom portion of the final container has a surface area larger than that of the semispherical surface and the bottom portion acquires a roughly dome-like shape. In heat-treating the secondary article that is subjected to the primary blow-molding, not only the bottom portion but also part of the barrel portion continuous to the bottom portion are heated by infrared-ray radiation, so that the portion that should serve as the bottom portion of the final product will have a size that can be accommodated in the semispherical surface and will have a shape that is relatively close to that of the semispherical surface.

In conducting the primary blow-molding, forming a portion that should serve as the bottom portion of the final container to have a surface area larger than that of the semispherical surface is important in forming the portion of the tertiary article to be subjected to the secondary blow-molding that should serve as the bottom portion of the final container in a shape which is relatively close to that of the semispherical surface and in maintaining the amount of the resin for forming the foot portions of the final container without causing them to have an extremely reduced thickness.

Heat-treatment of the secondary article offers the action for contracting the bottom portion and part of the barrel portion of the secondary article having large surface areas so as to be accommodated in the semispherical bottom valley portions of the final product, the action for elevating the temperature of the heated portion up to a temperature suited for being subjected to the secondary blow-molding, and the action for heat-crystallizing the crystallized bottom portion other than the thick bottom center to improve its heat resistance and pressure resistance. When the portion that should serve as the bottom portion of the final container is not accommodated in the semispherical surface, it becomes difficult to effect the secondary blow-molding. Furthermore, when the portion that should serve as the bottom portion of the final container has a shape far from the semispherical shape, the thickness of the foot portions becomes too small or the foot portions are ruptured during the blow-molding.

As a rough indication of heat-shrinking of the tertiary article, the surface area of the portion that should serve as the bottom of the final container should be from 65 to 98% of the surface area of the semispherical surface.

In the heat-shrunk portion of the tertiary article, when the surface area is smaller than 65% of the surface area of the semispherical surface, rupture may occur during the secondary blow-molding, foot portions may not be formed in good shape, or the thickness becomes very small at ends of the foot portions when the heating temperature is high. It is desired that the surface area of the portion that should serve as the bottom portion of the final container is close to that of the semispherical surface. When the surface area is too close, however, the portion may not often be accommodated in the metal mold for the secondary blow-molding. Therefore, the surface area should lie within the aforementioned range.

As a rough indication of the secondary article, it is desired that the bottom portion, except the bottom center, has a thickness of not larger than 1 mm and a degree of crystallinity of not smaller than 20%. Furthermore, the portion that should serve as the bottom portion of the final container should have a surface area which is 110 to 200% of the surface area of the semispherical surface.

The shape of the secondary article obtained through the primary blow-molding plays an important role for bringing the shape of the heat-shrunk portion of the tertiary article of before the secondary blow-molding close to the shape of the semispherical surface of the bottom portion of the container. When the surface area of the portion of the secondary article that should serve as the bottom portion of the final container is smaller than 110% of the surface area of the semispherical surface, the heat-shrunk portion of the tertiary article becomes too small and makes it difficult to execute the secondary blow-molding. When the surface area exceeds 200%, on the other hand, it becomes difficult to accommodate the heat-shrunk portion of the tertiary article within the secondary metal mold.

The secondary article is heated over relatively wide curved surface areas thereof. Therefore, the contact-type heating is not suited for obtaining a shape that is desirably shrunk. Therefore, the non-contact-type heating is preferred. Owing to the heating under the non-contacting and unlocked state, the secondary article can be shrunk in both the direction of barrel diameter and the direction of height simultaneously to obtain the tertiary article having a desired shape. In the present invention, in particular, it is desired to heat the article by infrared-ray radiation which features high heating efficiency making it possible to shorten the heating time.

Figure 22:
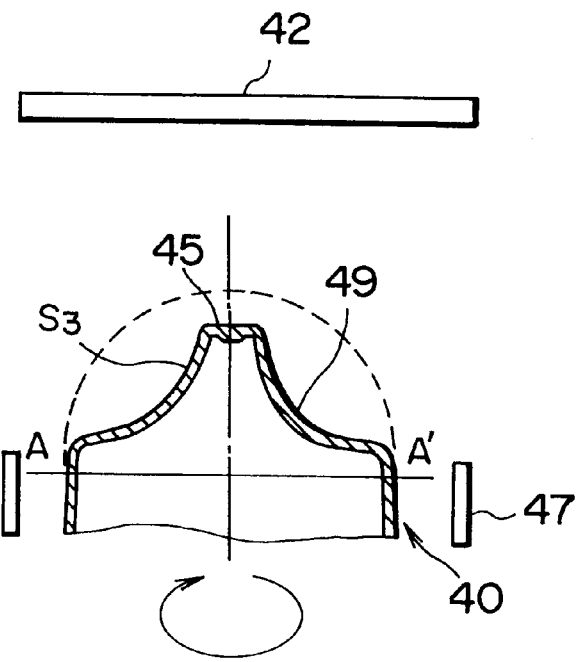
FIG. 22 is a sectional view illustrating the state of heat-shrinking the secondary article by effecting the heating from the bottom only.

That is, not only the bottom portion of the secondary article but also part of the barrel portion continuous to the bottom portion are heated by infrared-ray radiation, enabling the heated portion having a relatively large surface area, i.e., enabling the portion that should serve as the bottom portion of the final container, to be accommodated in the semispherical surface. Thus, the bottom portion as well as part of the barrel portion continuous to the bottom portion are shrunk so as to acquire areas close to that of the semispherical surface. When the bottom portion only is heated by infrared-ray radiation, on the other hand, a portion that should serve as the bottom portion of the final container is formed which is very remote from the semispherical surface as shown in FIG. 22, making it difficult to smoothly execute the secondary blow-molding.

Figure 20:
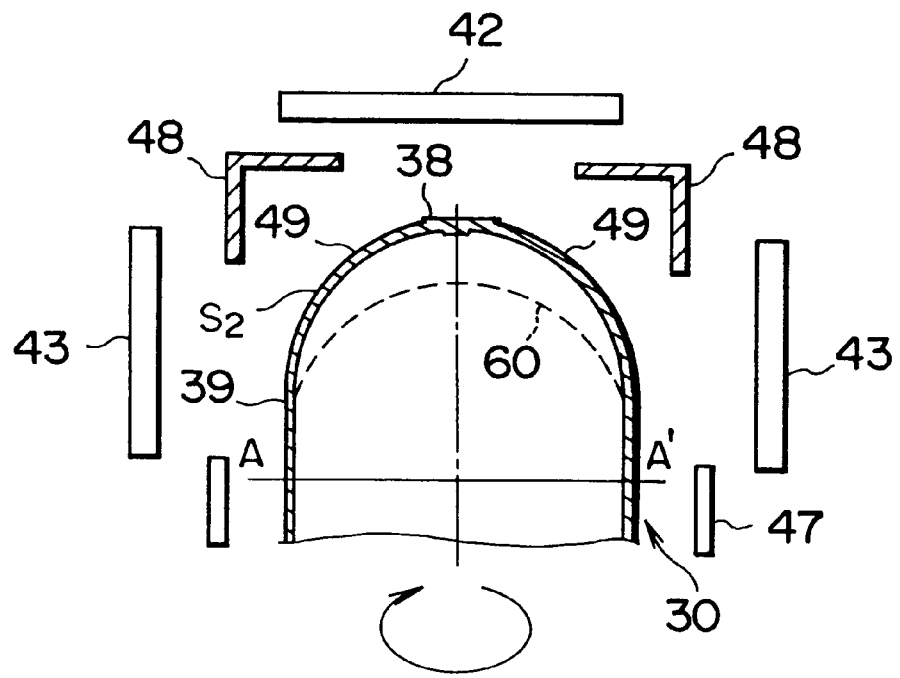
FIG. 20 is a sectional view of a state of before the heat treatment by installing a shielding plate between an infrared-ray radiator for heating the bottom portion and an infrared-ray radiator for heating part of the barrel portion.
Figure 21:
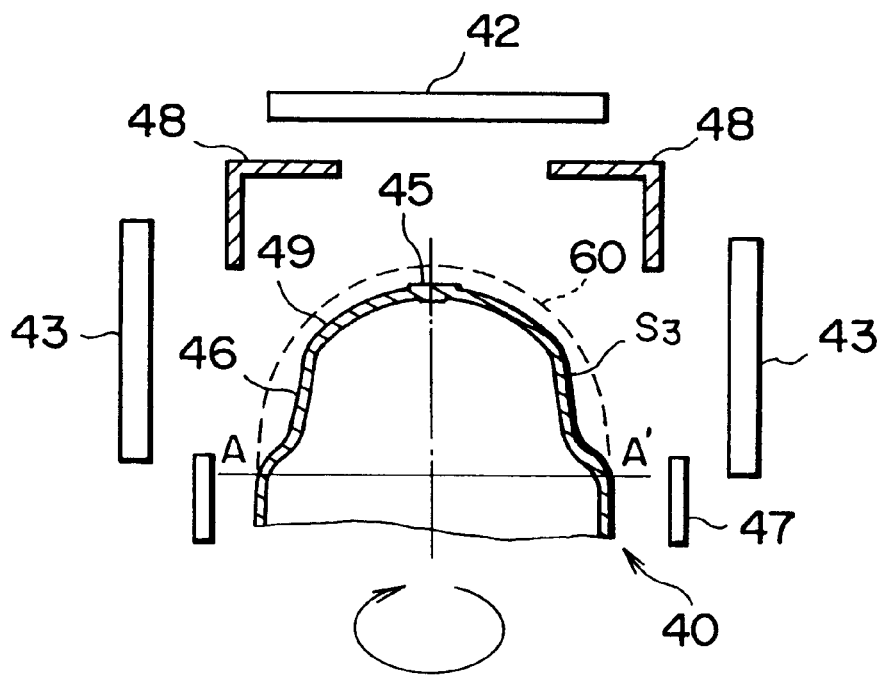
FIG. 21 is a diagram same as FIG. 20 illustrating a state of after the heat treatment.

As shown in FIGS. 20 and 21, furthermore, it is effective in obtaining the bottom portion of the tertiary article in the above-mentioned shape by irradiating the bottom shoulder portions of the secondary article with infrared rays in an amount smaller than that with which other portions are irradiated in the initial stage in the step of heat-shrinking the secondary article. Therefore, heat-shrinking of the bottom shoulders is suppressed to some extent, and the tertiary article is obtained relatively easily having bottom shoulder portions in a shape very close to that of the semispherical surface.

Figure 24:
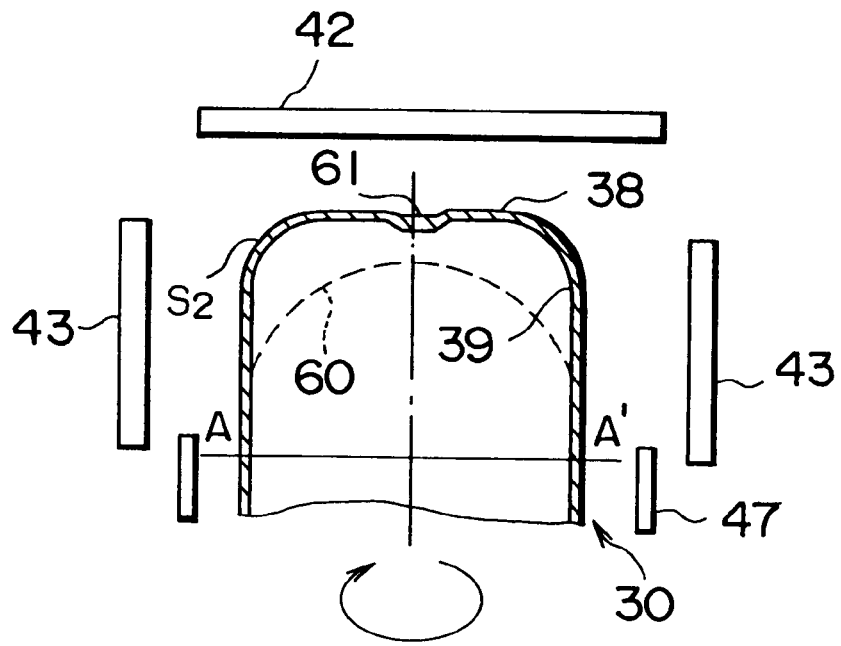
FIG. 24 is a sectional view illustrating a step (before heated) of heat-shrinking the secondary article of FIG. 23.
Figure 25:
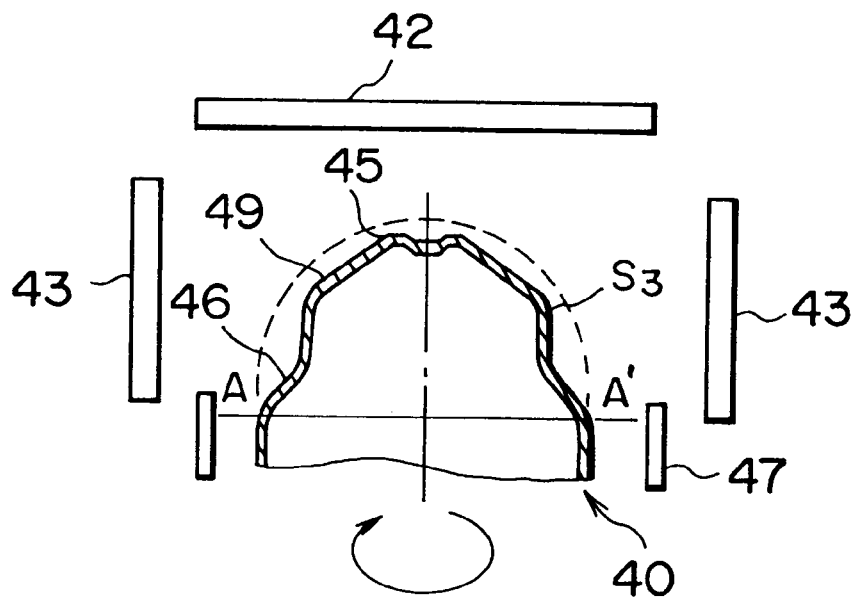
FIG. 25 is a sectional view illustrating a step (after heated) of heat-shrinking the secondary article of FIG. 23.

As shown in FIGS. 24 and 25, furthermore, a relatively small dent formed in the outer surface at the center of the dome-shaped bottom portion of the secondary article is effective in obtaining the bottom portion of the tertiary article in the above-mentioned shape. This is probably due to that the dent is acting to lift up the bottom portion onto the semispherical surface at the time of heat-shrinking.

Figure 27:
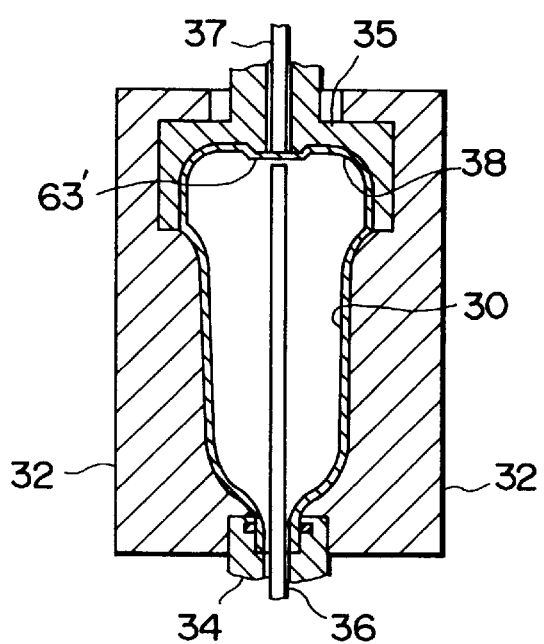
FIG. 27 is a diagram illustrating a state of when the blow-molding is finished in the step of primary blow-molding in the two-stage blow-molding.

To accomplish the similar object as shown in FIG. 27, furthermore, it is also recommended to form the dome-shaped bottom portion of the secondary article in a diameter larger than the diameter of the barrel portion or the bottom portion of the final container. This is presumably due to that the bottom portion having a large diameter causes the tertiary article to be in a shape very close to the semispherical surface of final product at the time of heat-shrinking.

It is further important to face the bottom portion of the secondary article and part of the barrel portion continuous to the bottom portion to the infrared-ray radiators to heat-shrink and heat-set such portions. By employing the non-contacting heating method, it is allowed to heat-shrink the bottom portion of the secondary article and part of the barrel portion continuous to the bottom portion, so that the bottom portion and part of the barrel portion continuous to the bottom portion of the heat-shrunk tertiary article are obtained in shapes favorable for forming the valley portions and foot portions.

In this case, it is desired that the tertiary article is heated at a temperature of from 130° C. to 200° C. The bottom portion of the secondary article which is highly drawn to acquire a reduced thickness through the primary blow molding has poor moldability. To favorably effect the secondary blow-molding, therefore, the secondary article must be heated at 130° C. to 200° C.

By heat-setting the heated portions of the tertiary articles at a temperature of 130° C. to 200° C., furthermore, the degree of crystallinity at such portions can be increased to not smaller than 30%. Through the secondary blow-molding, the degree of crystallinity decreases to some extent depending upon the degree of drawing. In the valley portions where the degree of drawing is relatively small, the decrease in the degree of crystallinity through the secondary blow-molding is relatively small, and it is allowed to maintain the degree of crystallinity of 30 to 55% in the spherical valley surfaces where the pressure resistance and creep strength are particularly required near the center of the bottom portion. In addition to improving the heat resistance and pressure resistance relying upon the high degree of drawing and orientation of the bottom portion, it is made possible to further increase the heat resistance and pressure resistance relying upon the crystallization of the bottom portion.

Through the biaxial stretch-blow-molding which is the primary blow-molding, the little-drawn thick portion is formed at the center of the bottom portion of the secondary article. The inventors, however, have further forwarded keen study and have found a biaxial stretch-blow-molding means capable of further increasing the strength by subjecting the whole bottom portion inclusive of the bottom center to a relatively high degree of drawing to reduce its thickness.

That is, the inventors have found the fact that in conducting the biaxial stretch-blow-molding step using a pressing rod and a stretching rod, the center of the bottom portion held by the stretching rod and the pressing rod and the peripheral edges thereof can be highly drawn to reduce their thicknesses during the period of just before the blowing step is finished by suppressing the drop of temperature at the bottom portion of the preform held by the stretching rod and the pressing rod to lie within a predetermined range.

In the step of biaxial stretch-blow-molding, first, the preform is heated up to a drawing temperature and is inserted in the metal mold for blow-molding. In the metal mold for blow-molding, the preform is held at its bottom portion by the moving stretching rod installed therein and the pressing rod that is installed on the outside and is pushed by a predetermined force. The stretching rod is, then, raised and, at the same time, a high-pressure gas is introduced into the preform. Therefore, the preform is drawn, inflates and is molded in a shape that complies with that of the metal mold for blow-molding. Then, usually, a cold high-pressure gas is introduced into the molded article which is, hence, cooled inside the metal mold for blow-molding. The high-pressure gas is then removed, and the molded article is taken out of the metal mold.

At this moment, it is important to bring the temperature for heating the bottom portion of the preform close to the temperature for heating the barrel portion. Concretely speaking, it is desired that the difference is within 10° C. between the temperature for heating the bottom portion of the preform and the temperature for heating the barrel portion.

When the temperature for heating the barrel portion of the preform is higher than the temperature for heating the bottom portion by more than 10° C., the bottom portion which is heated at a relatively low temperature is drawn insufficiently. When the temperature for heating the bottom portion is higher than the temperature for heating the barrel portion by more than 10° C., furthermore, the bottom portion is locally drawn excessively, which is not desirable.

The period of just before the drawing is finished stands for a period of after the blow-molding is started up to just before the molded article arrives at the metal mold for blowing. During the period of just before the blowing is finished, the barrel portion of the preform is nearly adiabatically drawn though it is affected by the temperature of the gas that is blown, and its temperature is raised usually by about 5 to 10° C. due to the heat generated by the drawing. In the bottom portion of the preform, on the other hand, the temperature decreases since it is sandwiched by the stretching rod and the pressing rod from the start of the blow-molding.

According to the present invention, it was found that the sandwiched portion and the peripheral edges thereof can be drawn to a relatively large degree to reduce its thickness by suppressing the drop of temperature at the sandwiched portion of the bottom portion of the preform within 40° C. and, preferably, within 25° C. during the period of just before the blowing is finished.

When the temperature drop at the sandwiched portion of the bottom portion of preform exceeds 40° C. during the period of just before the blowing is finished, it becomes difficult to draw the periphery of the sandwiched portion during the blowing; i.e., this portion remains being drawn relatively little and having a relatively large thickness. That is, only those portions having a small temperature drop other than the bottom center are drawn to a relatively high degree.

Preventing the excess conduction of heat from the stretching rod and the pressing rod is effective in decreasing the temperature drop at the sandwiched portion in the bottom portion of the preform. Concretely speaking, it is desired that at least tips of the stretching rod and of the pressing rod are made of a heat resistant plastic material or a ceramic material.

Means for maintaining a relatively high temperature is also effective in heating the pressing rod or the stretching rod. It is desired that the pressing rod and the drawing rod are heated at 60° C. to 130° C. to meet the temperature for blowing the preform.

The heating system may be an electric heating system using, for example, electric heater or high-frequency induction heating, a fluid heating system by circulating a high-temperature fluid, or a heat conduction system using heat pipe, etc.

EMBODIMENTS

Described below is an embodiment for producing the container of the present invention by the two-stage blow-molding method.

In producing the container, first, a cylindrical preform with bottom is molded and, as required, the mouth-and-neck portion of the preform is heated to form a locally spherulited portion.

Figure 19:
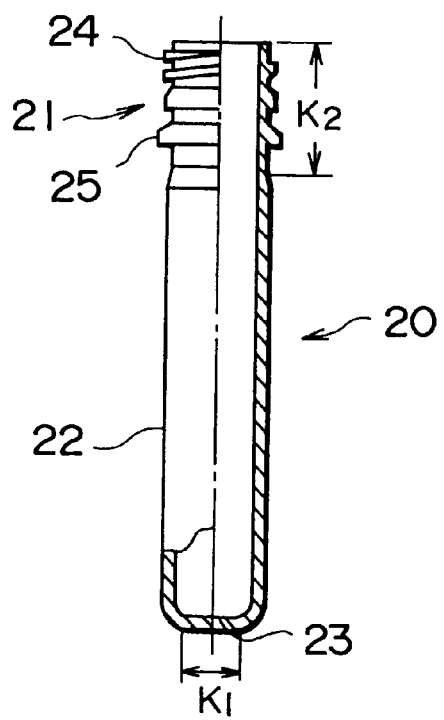
FIG. 19 is a sectional view of the cylindrical preform with bottom used for the present invention.

The preform used for producing the container of the present invention has a shape as designated at 20 in FIG. 19. This preform 20 comprises a neck portion 21, a barrel portion 22 and a closed bottom portion 23. The neck portion 21 is provided with a closure-fastening mechanism such as a screw 24, a support ring 25 for holding the container and the like. The neck portion 21 and the closed bottom portion 23 are spherulited. (The spherulited portions are shown in FIG. 19 as areas K2 and K1, respectively.) The neck portion 21 in FIG. 19 corresponds to the mouth-and-neck portion 1 of the container 101 in FIG. 1.

The injection machine is a known one equipped with an injection plunger or a screw, and injects the aforementioned polyester into the injection mold through nozzle, sprue and gate. Thus, the polyester flows into the cavity in the injection mold and is solidified to form a preform that is to be stretch-blow-molded.

The injection mold has a cavity that corresponds to the shape of the container. The invention may employ the injection mold of the one-gate type or the multi-gate type.

It is desired that the injection temperature is from 270° C. to 310° C., and the pressure is from about 28 to about 110 kg/cm$^2$.

The neck portion 21 of the preform 20 is spherulited by being selectively heated by any widely known means. The polyesters are thermally crystallized conspicuously at a specific temperature of crystallization. Generally, therefore, the corresponding portion of the preform should be heated at a temperature of crystallization. The heating may be infrared-ray heating or induction heating. Generally, the barrel portion that is to be drawn is shut off from the heat source using a heat-insulating material, and is selectively heated.

The spherulization may be effected simultaneously with the preheating to a drawing temperature of the preform 20 or separately therefrom.

The preform is generally drawn at a temperature of from 85 to 135° C. and, particularly, from 90 to 130° C. The heating is effected by a widely known means such as infrared-ray heating, hot-air heating furnace or induction heating. The mouth portion can be spherulited by heating the bottom portion and the mouth portion of the preform, usually, at a temperature of from 140 to 220° C. and, particularly, from 160 to 210° C. in a state where they are thermally insulated from other portions. It is desired that the mouth portion of the preform has a degree of crystallinity of not smaller than 25%.

Figure 16:
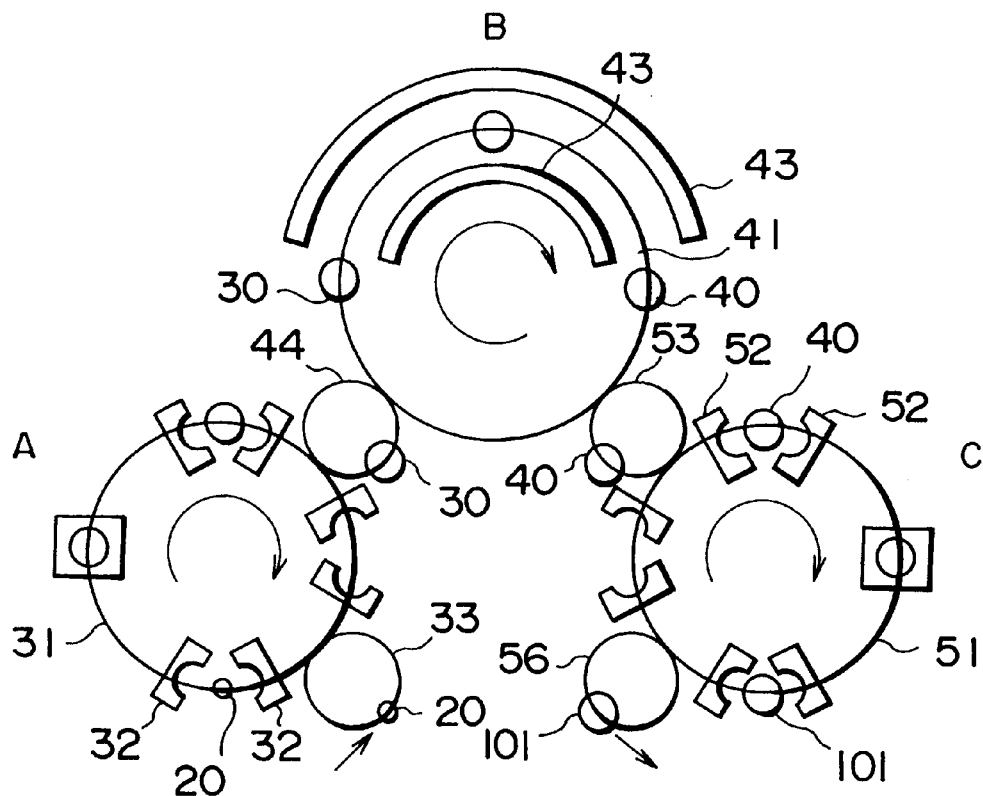
FIG. 16 is a diagram schematically illustrating the whole arrangement of the production apparatus of the present invention.

Referring to FIG. 16 schematically illustrating the production apparatus of the present invention, the apparatus roughly comprises a primary blow-molding device A for primarily blow-molding the preform 20 into a secondary article 30, a heat-treating device B for heat-shrinking and heat-setting the secondary article 30 into a tertiary article 40, and a secondary blow-molding device C for molding the tertiary article 40 into a final container 101.

In the primary blow-molding device A, metal molds 32 for primary blow-molding that can be opened and closed are arranged in many number along the periphery of a rotary turret 31, and the preform 20 is fed by a preform-feeding mechanism 33 into the metal mold 32 that is opened.

Figure 8:
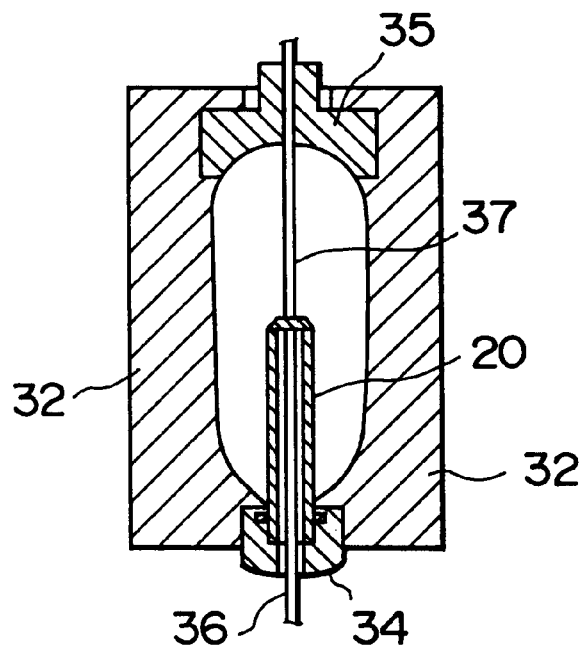
FIG. 8 is a sectional view illustrating a step for inserting a preform in a metal mold for primary blow-molding in a primary blow-molding device.
Figure 9:
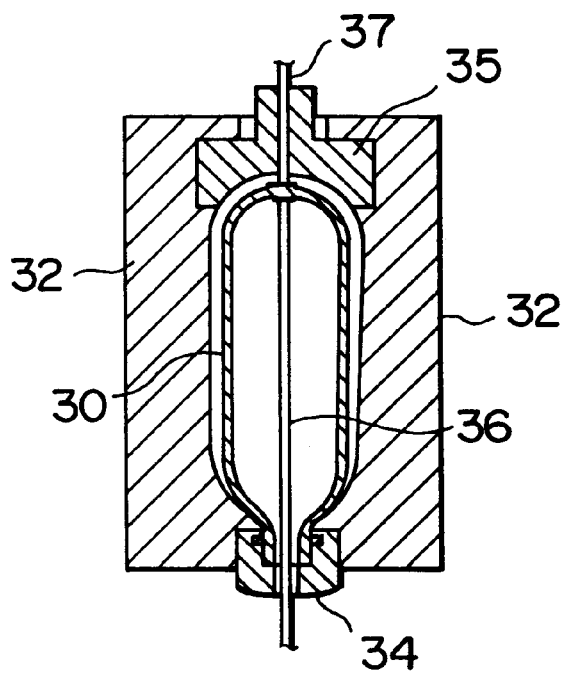
FIG. 9 is a sectional view illustrating a step for obtaining a secondary article through the primary blow-molding using a primary blow-molding device.

Referring to FIGS. 8 and 9 illustrating the primary blow-molding device A in detail, the preform 20 is supported at its neck portion by a core metal mold 34 and is held in the closed metal mold 32. On the opposite side of the core metal mold is arranged a bottom metal mold 35 for defining the shape of the bottom of the secondary article. A stretching rod 36 30 is inserted in the preform 20, its end is pushed onto the bottom portion of the preform to pull and draw the preform 20 in the axial direction. A fluid is blown into the preform 20 from a fluid feeding mechanism (not shown) connected to the core metal mold 34, so that the preform is inflated and is drawn in the circumferential direction. Here, a pressing rod 37 is arranged on the side of the bottom metal mold 35 in concentric with the stretching rod 36. During the blowing, the spherulited bottom portion 23 of the preform is sandwiched between the stretching rod 36 and the pressing rod 37, and is positioned at the center of the secondary article 30 that is molded. The bottom metal mold 35 so works that the bottom portion of the secondary article 30 acquires a shape that is suited for the subsequent heat-treating step B. These mechanisms are arranged in concentric with the rotary turret.

It is desired that the drawing ratios are from 2 to 5 times and, particularly, from 2.2 to 4 times in the axial direction, and from 2.5 to 6.6 times and, particularly, from 3 to 6 times in the circumferential direction. The drawing ratio in the axial direction is determined by the length of the preform in the axial direction and the length of stroke of the stretching rod, but the drawing ratio in the circumferential direction is determined by the diameter of the preform and the diameter of cavity of the metal mold. The shape of the bottom portion will be described later with reference to FIGS. 17 and 18. The pressurized fluid will be the air of room temperature or that is heated, any other gas such as nitrogen, carbonic acid gas, or water vapor having a pressure of, usually, from 10 to 40 kg/cm$^2$ gauge and, particularly from 15 to 30 kg/cm$^2$ gauge.

The heat-treating step B includes a rotary turret 41 for supporting many core metal molds (mandrels) 34 (see FIGS. 8 and 9) permitting them to rotate both about their own axes and about the rotary turret, and infrared-ray radiators 42 and 43 for heating the secondary articles 30 on the core metal molds 34.

Figure 10:
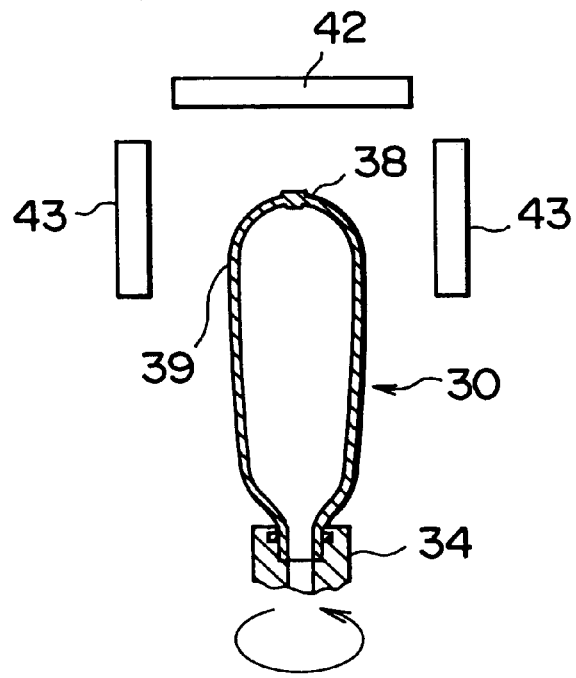
FIG. 10 is a sectional view illustrating a step for inserting the secondary article while rotating it in an infrared-ray radiator in a heat-treating apparatus.
Figure 11:
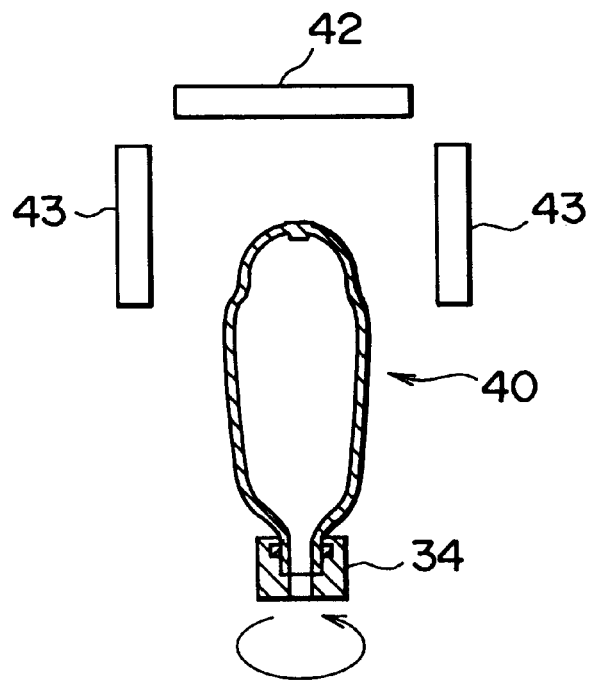
FIG. 11 is a sectional view illustrating a step for obtaining a tertiary article by heat-shrinking the bottom portion of the secondary molded article and part of the barrel portion continuous thereto in the heat-treating apparatus.

Referring to FIG. 10 illustrating in detail the heat-treating step, the secondary article 30 rotates about its own axis being supported by the core metal mold 34, and the infrared-ray radiators 42 and 43 are provided so as to be faced to the bottom portion 38 of the secondary article 30 and part 39 of the barrel portion continuous to the bottom portion. The secondary article 30 is fed to the rotary turret 41 in the heat-treating step B through a transfer mechanism 44 and rotates, so that the bottom portion 38 and part 39 of the barrel portion continuous to the bottom portion are heated by infrared-rays from the infrared-ray radiators 42 and 43. The bottom portion 38 and part 39 of the barrel portion shrink upon the heating to form a tertiary article 40 (FIG. 11).

In the concrete example shown in FIG. 16, the heat-treating step B comprises the rotary turret 41. However, the heat-treating step B is in no way limited thereto only. For instance, the heat-treating step B may be a conveyer that circulates linearly. In this case, the secondary article 30 is heated at its bottom portion and part of the barrel portion continuous to the bottom portion while moving straight by the infrared-ray radiators that are linearly arranged along the conveyer.

In the secondary blow-molding step C, metal molds 52 for secondary blow-molding that can be opened and closed are arranged in many number on a rotary turret 51 along the periphery thereof, and the tertiary article 40 is fed by a feeding mechanism 53 into the metal mold 52 that is opened.

Figure 12:
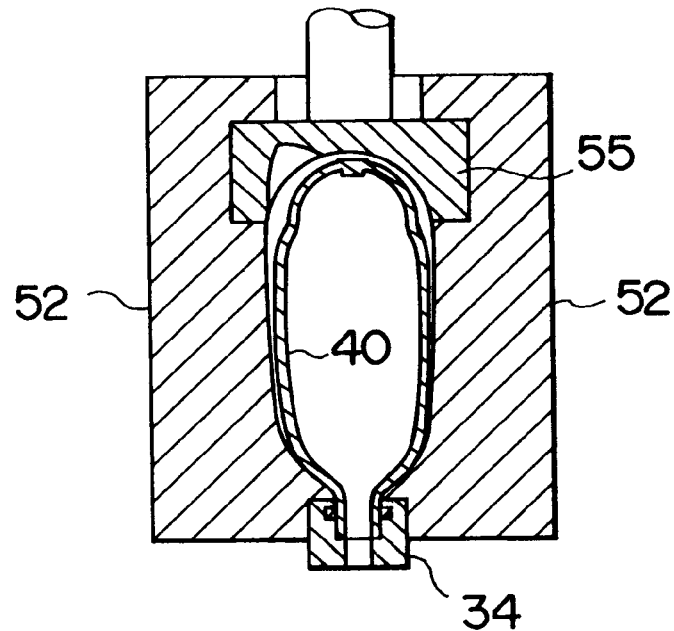
FIG. 12 is a sectional view illustrating a step for inserting the tertiary article in a metal mold for secondary blow-molding using a secondary blow-molding device.
Figure 13:
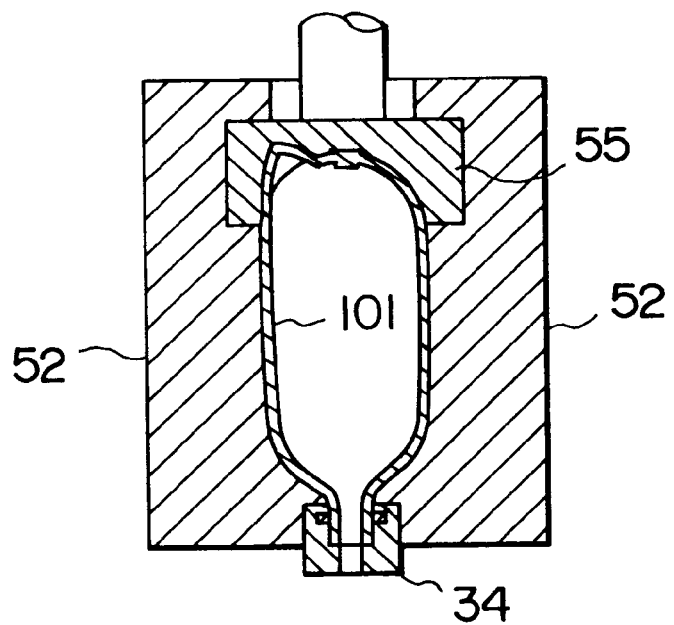
FIG. 13 is a sectional view illustrating a step for obtaining a final product by the secondary blow-molding using the secondary blow-molding device.
Figure 14:
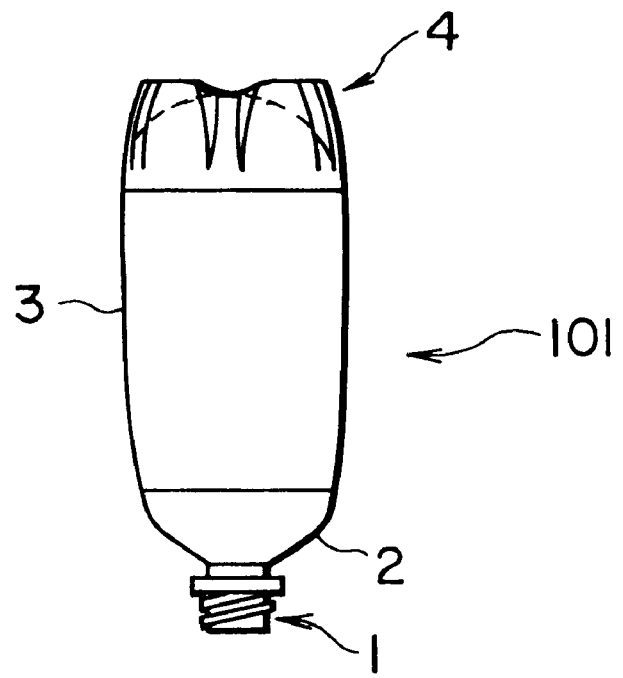
FIG. 14 is a side view of a heat resistant and pressure resistant self-standing plastic bottle of the present invention.
Figure 15:
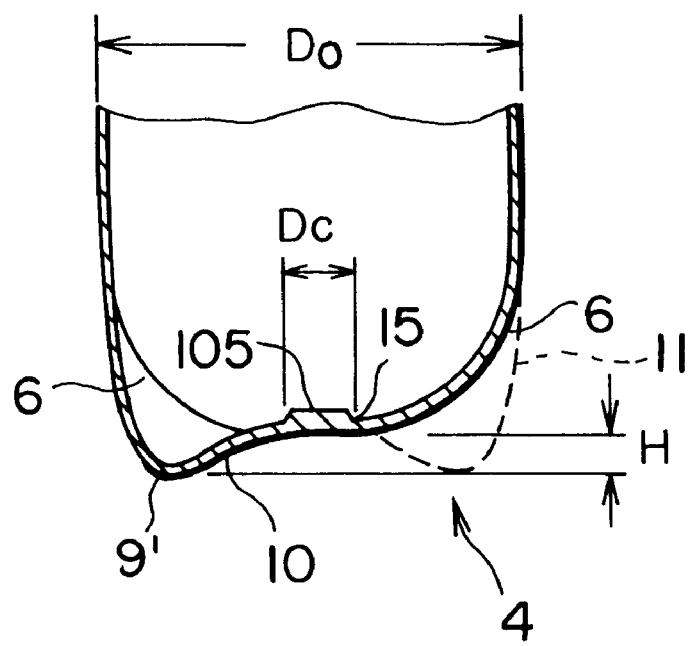
FIG. 15 is a sectional view illustrating, on an enlarged scale, the bottom portion of the bottle of FIG. 8.

Referring to FIGS. 12 and 13 illustrating in detail the secondary blow-molding step C, the heated tertiary article 40 is supported at its neck portion by the core metal mold 34 and is held in the split metal mold 52 that is closed. On the opposite side of the core metal mold is arranged a bottom metal mold 55 for defining the shape of the bottom of the final container. A fluid is blown into the tertiary molded article 40 to blow-mold the tertiary article 40 and to mold the bottom portion of the final container having valley portions and foot portions. The molded container 101 is taken out by a take-out mechanism 56 from the metal mold 52 for secondary blow-molding that is opened.

Figure 17:
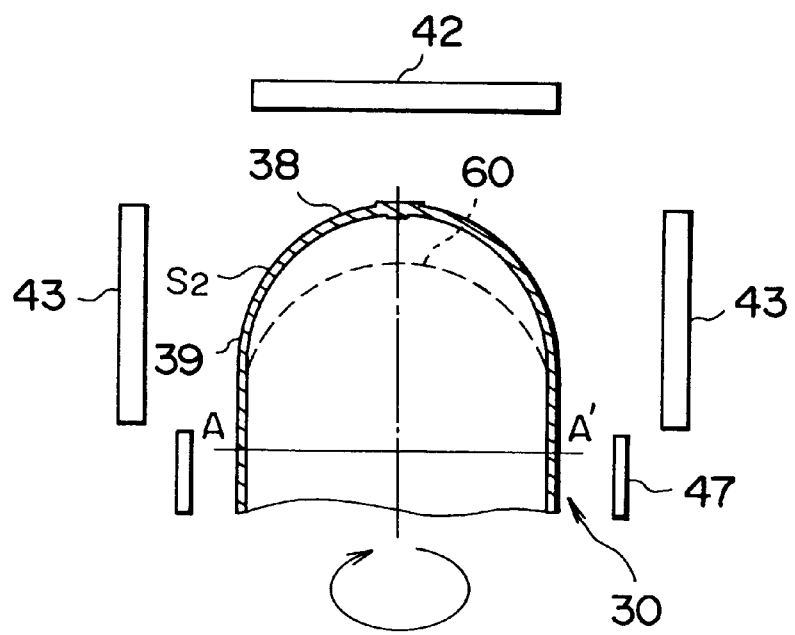
FIG. 17 is a diagram a step of heat-shrinking (before heated) illustrating a portion of the secondary article that should serve as the bottom of the final container in comparison with the semispherical surface of the final container.
Figure 18:
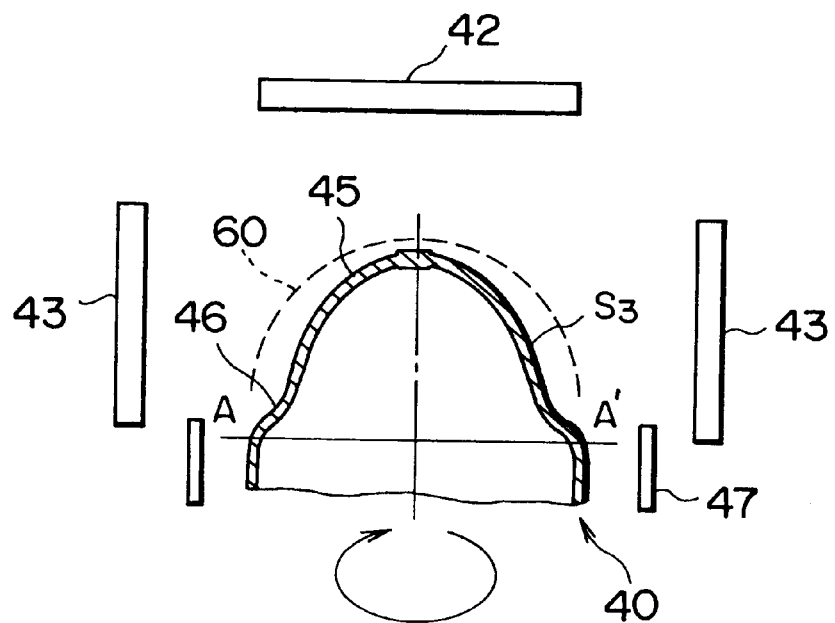
FIG. 18 is a diagram illustrating a step of heat-shrinking (after heated) illustrating a portion of the tertiary article that should serve as the bottom of the final container in comparison with the semispherical surface of the final container.

Referring to FIGS. 17 and 18 illustrating changes in the shape and size of the bottom portion before and after the heat-treating step B, it is important to heat-shrink the tertiary article 40 and to secondarily blow-mold the tertiary article so that a portion of the tertiary article 40 that should serve as the bottom portion of the final container, i.e., so that the bottom portion 45 that is heat-shrunk and part 46 of the barrel portion continuous to the bottom portion, is accommodated within an imaginary semispherical surface 60 (indicated by a dotted line) on where are substantially located the bottom valley portions of the final container, and that these portions acquire a shape relatively close to that of the semispherical surface 60, from the standpoint of molding the bottom portion in a desired shape and accomplishing improved heat resistance and creep strength.

It is generally desired that the tertiary article is heat-shrunk and is secondarily blow-molded such that the surface area $S_3$ of the heat-shrunk bottom portion 45 of the tertiary article 40 and of part 46 of the barrel portion continuous to the bottom portion is from 65 to 98% of the surface area $S_O$ of the imaginary semispherical surface 60 on where are substantially located the valley portions of the final container, on the side of the bottom from a line A-A' that is a boundary between the bottom portion and the barrel portion of the final container.

In order that the tertiary article 40 acquires the bottom portion of the above-mentioned shape, it is desired that the bottom portion 38 to be heated of the secondary article 30 and part 39 of the barrel portion continuous to the bottom portion exist on the outer side of the imaginary semispherical surface 60 of the final container and have surface areas that lie within a predetermined range. That is, the primary blow-molding and the secondary blow-molding should be effected so that the surface area $S_2$ of a portion of the secondary article that should serve as the bottom portion of the final container, i.e., of the portions 38 and 39 on the side of the bottom from the line A-A', becomes from 110 to 200% of the surface area $S_0$ of the imaginary semispherical surface on where are substantially located the bottom valley portions of the final container.

In the concrete example shown in FIGS. 17 and 18, the surface of the barrel portion 3 is covered with a heat-insulating member 47 to prevent the barrel portion 3 from being subjected to the heat treatment.

It is desired that the bottom portion 38 of the secondary article 30 and part 39 of the barrel portion are heated at a temperature of from 130 to 200° C. from the standpoint of effectively heat-shrinking and heat-setting these portions. The heating by using infrared-ray radiators is the non-contact heating. Therefore, the bottom portion and part of the barrel portion shrink without being locked. Besides, infrared rays falling on the surfaces of the secondary article partly penetrate therethrough and arrive at the inner surface on the side opposite to the irradiated portion. Thus, part of the infrared rays that has penetrated is absorbed, and the container is heated by infrared rays even from the inner side, enabling the heating to be accomplished very efficiently and uniformly within short periods of time.

Furthermore, the infrared-ray radiators 42 and 43 in the above-mentioned heat-treating step are arranged on the upper and side surfaces of the passage through which the secondary article 30 moves, and the secondary article is moved through the infrared-ray radiators while being rotated about its axis. In this case, the secondary article is uniformly and homogeneously heated at its predetermined portions making it possible to simultaneously accomplish both the heat-shrinking and the motion between the steps. Thus, the heat-treatment is effected without waste of time, and the productivity can be enhanced. It is desired that the infrared-ray radiators are made up of a combination of those that are heated at about 400 to 1000° C., have relatively excellent radiation efficiency and have surfaces of relatively large planar areas. This makes it possible to irradiate the secondary article with infrared rays having a relatively high energy density contributing to shorten the time for heating. In the present invention, in particular, the heated portions of the secondary article are highly drawn to acquire a reduced thickness and can, hence, be heated at a predetermined temperature within a short period of time of not longer than, for example, 10 seconds by the infrared-ray radiators.

Moreover, when the secondary article containing relatively narrow little-drawn thick portions in the valley portions thereof is heated by using infrared rays of a relatively large intensity for short periods of time, the thick portions exhibit larger heat capacity than the surrounding thin portions that are relatively highly drawn and absorb less amounts of infrared rays. Compared with the peripheral thin portions, therefore, the thick portions are maintained at relatively low temperatures. Therefore, the bottom portion can be heat-set without almost permitting the thick portions to be whitened.

As the infrared-ray heater, there can be concretely utilized a metallic surface such as of a carbon steel or a stainless steel, a ceramic surface such as of alumina, magnesia or zirconia, a solid surface such as a composite surface of ceramics and carbon, or a gaseous surface obtained by burning a gas. The surface of the infrared-ray heater made of a solid material is heated at a desired temperature by being heated using an electric heater buried therein or by high-frequency induction heating.

The bottom portion of the secondary article that is highly drawn through the primary blow-molding to acquire a reduced thickness has poor moldability and must have been molded at a temperature of from 130 to 200° C. for being favorably subjected to the secondary blow-molding. By heat-setting the heated portions of the tertiary product at a temperature of 130 to 200° C., furthermore, the degree of crystallinity at the bottom valley portions of the final container can be set to be 30 to 50%. In addition to improving the heat resistance and pressure resistance by highly drawing the bottom portions, the yielding load at 70° C. which represents the heat resistance and pressure resistance can be further enhanced by the crystallization of the bottom portion.

Referring to FIGS. 20 and 21, arrangement of an infrared-ray shielding plate 48 between the infrared-ray radiator 42 for heating the bottom portion and the infrared-ray radiator 43 for heating part of the barrel portion, is advantageous in preventing the bottom shoulder portion 49 from being excessively shrunk inwardly of the diameter and in obtaining the bottom portion in a shape close to a semispherical shape.

Referring to FIG. 22, when the secondary article is heat-shrunk at the bottom portions only, the bottom shoulder portion 49 is abnormally shrunk inwardly in the radial direction. Therefore, it is no longer allowed to mold the self-standing bottom portion from such a tertiary article because of destruction during the secondary blow-molding or the bottom portion is not molded in a correct shape if it could be molded. In these cases, the thickness of the foot portions become extremely small.

Figure 23:
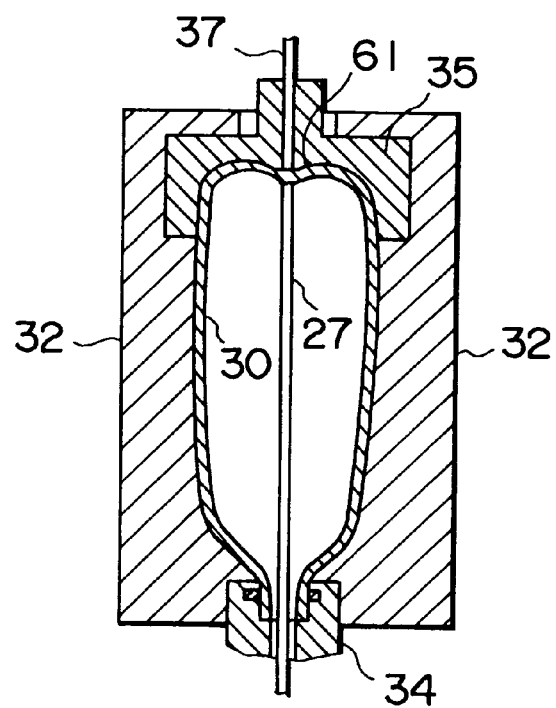
FIG. 23 is a sectional view illustrating the secondary article having a very small dent at the center of the bottom portion in the primary blow-molding.

Referring to FIG. 23, furthermore, when a relatively small recessed portion 61 is formed in the outer surface at the center of bottom portion 38 of the secondary article in the primary blow-molding, it is allowed to suppress the height at the center of the heated bottom portion 45 of the tertiary article in the heat-treating step shown in FIGS. 24 and 25. Therefore, it becomes easy to bring the position of the bottom shoulder portion 49 close to the semispherical valley surface of the final container. This is presumably due to that the recessed portion 61 in the bottom portion 38 of the secondary article tends to shrink downwardly, i.e., inwardly of the article during the heating. The recessed portion 61 has a size of about 15 to about 60% of the diameter $D_0$ of the barrel portion or of the maximum bottom portion of the final container and a depth of about 0.5 to about 5 mm.

In the secondary blow-molding step C of the present invention, the article (tertiary article) molded in the heat-treating step B is blow-molded in the metal mold for secondary blow-molding to form a bottom portion where the foot portions and valley portions are alternatingly arranged. In the secondary blow-molding as a matter of course, the cavity of the metal mold for secondary blow-molding must be larger than the tertiary article and must meet the size and shape of the final molded article inclusive of the shape of the self-standing bottom.

The tertiary article has an increased elasticity due to crystallization by the heat-treatment. It is therefore desired to employ the fluid of a pressure higher than that of the primary blow-molding and, generally, from 15 to 45 kg/cm$^2$.

In the secondary blow-molding, the metal mold may be maintained at a temperature of from 5 to 135° C., and may be cooled immediately after the molding. Or, the cold air may be blown into the finally molded article to cool it.

According to another embodiment of the present invention, there is provided a self-standing container having a reduced thickness even at the center of the bottom portion.

Figure 26:
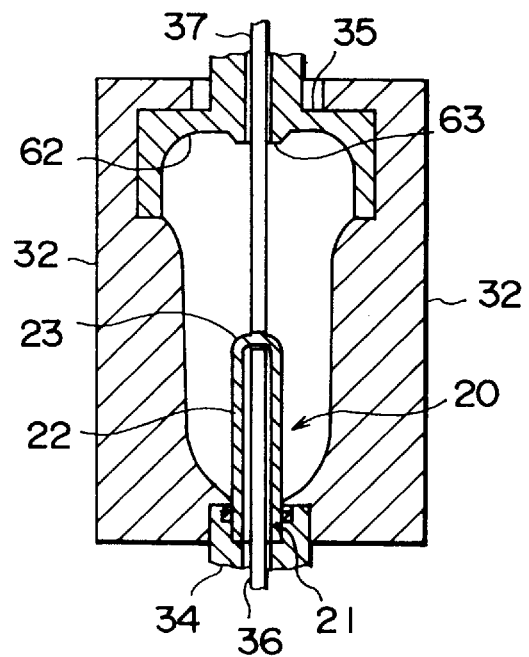
FIG. 26 is a diagram illustrating a state of starting the blow-molding in the step of primary blow-molding in the two-stage blow-molding.

Referring to FIG. 26 illustrating a step of the primary blow-molding, the preform 20 is supported at its neck portion by the core metal mold 34 and is held in the split metal molds 32, 32 that are closed. On the opposite side of the core metal mold is arranged a bottom metal mold 35 for defining the shape of the bottom portion of the secondary article. The stretching rod 36 is inserted in the preform 20. The end of the stretching rod is pushed onto the bottom portion of the preform 20 to pull and draw it in the axial direction. Besides, a fluid is blown into the preform 20 to inflate and draw the preform in the circumferential direction as well as in the direction of height. Here, to highly draw the bottom portion of the final product so that it acquires a reduced thickness, the bottom portion of the secondary article should be highly drawn to acquire a reduced thickness through the primary blow-molding.

The temperature drop at the sandwiched portion of the bottom of the preform is suppressed to be within 40° C. and, preferably, within 25° C. during the period of just before the blowing is finished. This makes it possible to highly draw and to reduce the thickness of the whole bottom portion inclusive of bottom center at which the bottom portion 38 of the secondary article 30 is sandwiched.

The bottom metal mold 35 so works that the bottom portion 38 of the secondary article 30 is highly drawn to acquire a reduced thickness and that the bottom portion 38 has a shape that is suited for being subjected to the subsequent heat-treating step.

That is, it is desired that the inner surface of the bottom metal mold 33 (bottom of the secondary article) has a roughly domed shape of a large radius of curvature so that the bottom portion is drawn to a high degree. It is further desired to form a flat portion 62 at the center of the bottom portion. Formation of a small degree of protuberance on the center of the bottom metal mold 35 and formation of a small degree of dent 63' at the center of the bottom portion of the secondary article are also effective in delaying the timing at which the article arrives at the peripheral edge of the protuberance 63 at the bottom center of the metal mold for blow-molding and in enhancing the degree of drawing at the center of the bottom portion and at the peripheral edges thereof. It is desired that the dent 63' has a diameter of from about 15 to about 60% of the diameter $D_0$ of the final container and a depth of from about 0.5 to about 5 mm.

As shown in FIG. 27, furthermore, it is further desired that the bottom portion 38 of the secondary article has a diameter larger than the diameter of the barrel portion or of the bottom portion of the final container. This enables the bottom portion 38 of the secondary article to be highly and effectively drawn to acquire a reduced thickness and enables the semispherical surface to be formed while suppressing the bottom portion of a large diameter from being dented toward the center when the bottom portion 38 of the secondary article is being heat-shrunk. It is desired that the bottom portion 38 of the secondary article has a diameter which is from about 1 to about 1.3 times as great as the diameter of the barrel portion or of the bottom portion of the final container.

The bottom portion 38 of the obtained secondary article inclusive of the center thereof has been highly drawn and crystallized possessing a degree of crystallinity of not smaller than 20% and, preferably, not smaller than 25%, and having a thickness of not larger than 1 mm and, preferably, not larger than 0.8 mm.

Figure 28:
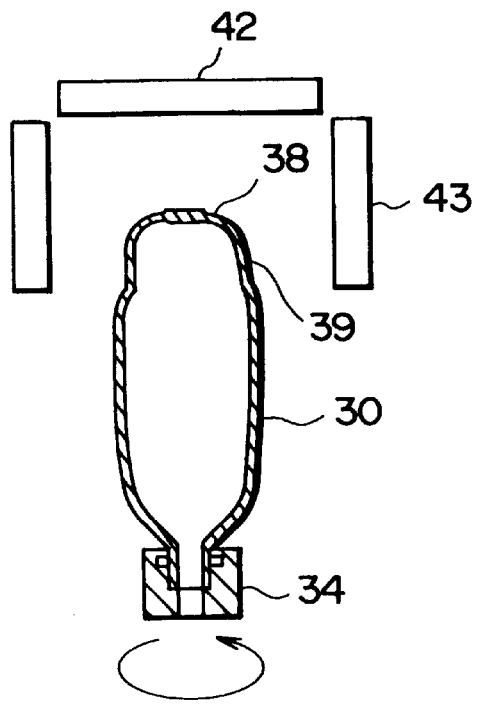
FIG. 28 is a diagram illustrating a step of heat-shrinking the secondary article in the two-stage blow-molding.

Referring to FIG. 28 illustrating in detail the heat-treating step, the secondary article rotates being supported by the core metal mold 34, and the infrared-ray radiator 43 is so provided as to be faced to the bottom portion of the secondary article and at least part of the barrel portion continuous to the bottom portion. The bottom portion of the secondary article and at least part of the barrel portion continuous to the bottom portion are heated by infrared-rays from the infrared-ray radiators 42, 43, and shrink in the direction of height and in the radial direction, so that there is obtained the tertiary article 40 which is the final product having the bottom portion and part 39 of the barrel portion of shapes that can be accommodated in the metal mold for secondary blow-molding.

It is desired that the bottom portion 38 of the tertiary article 40 has a shape which is as close as possible to that of the bottom valley portions of the metal mold for secondary blow-molding, enabling the foot portions of the final product to be easily formed.

In this case, the shape of the bottom portion of the secondary article plays an important role, and it is desired that the secondary article to be heat-shrunk has a large height and that the barrel portion continuous to the bottom portion of the secondary article has a diameter larger than that of the diameter of barrel portion of the product. It is further desired that a very small degree of recessed portion is formed at the center of bottom of the secondary article from the standpoint of preventing the center of bottom portion of the tertiary article from protruding during the heat-shrinking and obtaining a shape that is desirably heat-shrunk.

Figure 29:
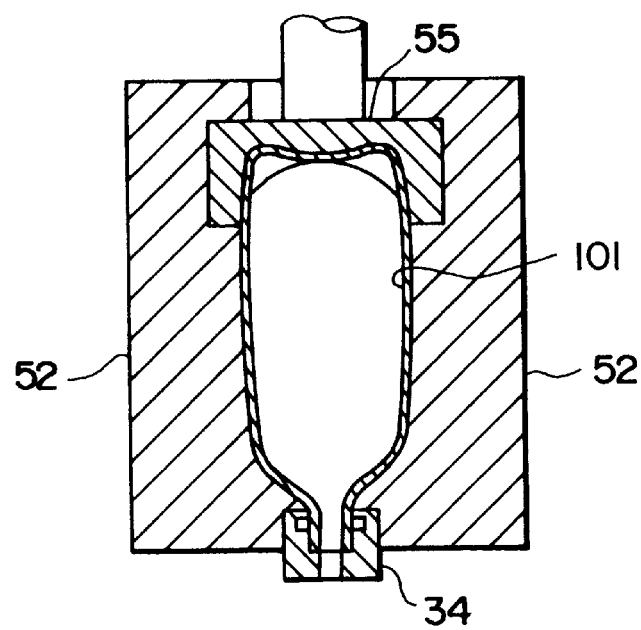
FIG. 29 is a diagram illustrating a step of a secondary blow-molding in the two-stage blow-molding.

Referring to FIG. 29 illustrating in detail the secondary blow-molding step, the tertiary article is supported at its neck portion by the core metal mold 34 and is held in the closed split metal mold 52. On the opposite side of the core metal mold is arranged the bottom metal mold 55 for defining the shape of bottom of the final container. The fluid is blown into the tertiary article 40 to secondarily blow-mold it in order to mold the bottom portion of the final container 101 that has predetermined valley portions and foot portions (six foot portions). The container 1 that is molded is taken out of the metal mold 52 for secondary blow-molding that is opened by using a known take-out mechanism (not shown).

Concretely described below are the relationships among the shape and sizes of the bottom portion of the container and various properties.

The containers of Examples and Comparative Examples were measured and were evaluated in a manner as described below.

(a) Thickness

Thicknesses of the samples were measured by using a micrometer (ball measuring device 2.38 mm in diameter).

(b) Degree of crystallinity

A density-gradient tube of the type of n-heptane-carbon tetrachloride (manufactured by Ikeda Rika Co.) was provided, and densities of the samples were found under a condition of 20° C. The degree of crystallinity was calculated in compliance with the following formula, $$\text{Degree of crystallinity } Xc = \frac{\rho_c}{\rho} \cdot \frac{\rho - \rho_{am}}{\rho_c - \rho_{am}} \times 100$$

$\rho$: measured density (g/cm$^3$)

$\rho_{am}$: amorphous density (1.335 g/cm$^3$)

$\rho_c$: crystalline density (1.455 g/cm$^3$)

(c) Yielding load

The bottom valley portions were punched using a metal mold as shown in FIG. 7 to obtain samples for tensile testing. Depending upon the shapes, the bottom valley portions could not be punched in the shape of the metal mold. Therefore, such portions were cut into a like shape.

The tensile testing was carried out in a constant-temperature bath maintained at 70° C. under the following conditions.

Tensile tester: Tensilon UCT-5T manufactured by Orientek Co.

Distance between chucks: 20 mm

Pulling speed: 10 mm/min.

A load value obtained from yielding points on a displacement curve of load shown in FIG. 6 was converted into a load value per a width of 1 cm, and was regarded to be an yielding load.

(d) Overturning angle of the container

The container was placed on a sample plate obtained by sticking a polishing paper of a mesh #320 on the surface of a steel board of which the angle was changed at a predetermined rate starting from the horizontal plane as shown in FIG. 2. The sample plate was tilted at a rate of 1°/sec. The angle of the sample plate from the horizontal plane of when the container overturned was measured, and was regarded to be the overturning angle α of the container.

Comparative Testing 1

By using an apparatus based on the two-stage blow-molding method as shown in FIGS. 26 to 29, a polyethylene terephthalate (PET) container was prepared having a maximum barrel diameter $D_0$ of the finally product of 91 mm, an overall height of 303 mm and a capacity of 1500 ml, with its bottom portion being constituted by six foot portions and valley portions.

A preform with bottom was primarily blow-molded using a metal mold for blowing having, as shown in FIG. 27, a height of 315 mm, and a diameter at the barrel portion continuous to the bottom portion of 102 mm, the bottom portion thereof having a recessed portion formed at the center thereof in a diameter of 30 mm and in a depth of 2 mm. In the primary blow-molding, the preform was first heated at a drawing temperature and was introduced into the metal mold. Then, the bottom portion of the preform was held by a stretching rod installed therein and a pressing rod installed on the outside. The compressed air of a pressure of 20 kgf/cm$^2$ was blown into the preform while pushing up the bottom portion of the preform using the stretching rod, thereby to effect the blow-molding and to obtain a secondary article.

As a comparative testing, secondary articles were prepared by changing the materials and temperature at the ends of the stretching rod and of the pressing rod and changing the difference in the heating temperatures between the barrel portion of the preform and the bottom portion. In Example 1 and Comparative Example 1, the ends of the stretching rod and of the pressing rod were made of a polytetrafluoroethylene (TF) having good heat-insulating property, and differences in the heating temperatures between the drum portion and the bottom portion of the preform were set to be 0° C. and 15° C., respectively. In Example 2, the end of the stretching rod was made of the polytetrafluoroethylene (TF), the end of the pressing rod was made of a steel and was heated at 65° C. by an electric heater embedded therein. In comparative Example 2, the ends of the stretching rod and of the pressing rod were made of a steel having good heat-conducting property, and the pressing rod was used in a state of room temperature.

The secondary articles obtained under the above-mentioned conditions were measured for their thickness $T_1$ (mm) and degree of crystallinity $X_1$ (%) at the center of bottom portion of the secondary articles, thickness $T_2$ (mm) and degree of crystallinity $X_2$ at the periphery of the bottom center 10 mm away from the center of the bottom portion. Moreover, a thermometer comprising a thermocouple was attached to the end of the pressing rod that comes into contact with the center of bottom portion of the preform, to measure a change in the temperature at the center of the bottom portion during the primary blow-molding and to find a temperature drop ΔTS (°C.) at the center of the bottom portion of from the start of blow-molding until just before the blow-molded product came into contact with the metal mold. The above-mentioned testing conditions and the measured results are shown in Table 1.

TABLE 1

|  | Example 1 | Comparative Example 1 | Example 2 | Comparative Example 2 |
|---|---|---|---|---|
| Material at the end of drawing rod Pressing rod | TF | TF | steel | steel |
| End material | TF | TF | TF | steel |
| End temp. (° C.) | room temp. | room temp. | 65 | room temp. |
| Temp. For heating preform |  |  |  |  |
| Barrel (° C.) | 100 | 100 | 100 | 100 |
| Bottom (° C.) | 100 | 85 | 100 | 100 |
| Temp. Drop ΔTS ° C. at the center of bottom 2ndary molded article | 5 | 5 | 30 | 60 |

TABLE 1-continued

|  | Example 1 | Comparative Example 1 | Example 2 | Comparative Example 2 |
|---|---|---|---|---|
| Center of bottom |  |  |  |  |
| $T_1$ (mm) | 0.38 | 1.7 | 1.48 | 1.55 |
| $X_1$ (%) | 22.6 | 1.3 | 2.1 | 1.0 |
| Periphery of bottom center |  |  |  |  |
| $T_2$ (mm) | 0.30 | 1.30 | 0.38 | 1.44 |
| $X_2$ (%) | 25.1 | 5.0 | 21.3 | 2.5 |

Then, the secondary article while being rotated was moved through a tunnel-like heat-treating apparatus having planar infrared-ray radiators arranged along the top surface and the side surface thereof, the planar infrared-ray radiators incorporating an electric heater in the ceramic material, so that the bottom portion of the secondary article and part of the barrel portion continuous to the bottom portion were heat-shrunk thereby to obtain a tertiary article. The temperatures of the infrared-ray radiators were 900° C. on the top surface and 750° C. on the side surface. The heating time was 6 seconds. The heated portions of the obtained tertiary product possessed the shapes that were relatively close to the shapes of bottom valleys of the final container and could be sufficiently accommodated.

Finally, by using the metal mold for secondary blow-molding having the bottom portion of a predetermined shape including six foot portions and valley portions, the tertiary article that has been heated was secondarily blow-molded by blowing the compressed air of 40 kgf/cm² to obtain the container. In the bottom of the metal mold for secondary blow-molding, the radius $R_1$ of curvature of the bottom valley portions near the center of the bottom portion was 67 mm, the ratio $S'/S_0'$ of the surface area $S_0'$ of the imaginary curved surface of the bottom portion within 40% of the barrel diameter $D_0$ to the total surface area $S'$ of the bottom valley portions within 40% of the barrel diameter $D_0$ was 0.72, the ratio $S/S_0$ of the surface area $S_0$ of the imaginary curved surface of the bottom portion within 80% of the barrel diameter $D_0$ to the total surface area $S_0$ of the bottom valley portions within 80% of the barrel diameter $D_0$ was 0.31, the height H of foot portions was 4 mm, and the foot opening angle θ including the valley portion was 71° on a plane crossing the foot portions and perpendicular to the valley portions.

The containers obtained by using four kinds of samples and by changing the primary blow-molding conditions were measured in regard to the thickness $T_3$ (mm) and degree of crystallinity $X_3$ (%) at the center of bottom portion, and thickness $T_4$ (mm) and degree of crystallinity $X_4$ (%) at valley portions in the periphery of the bottom center 10 mm away from the center of the bottom portion. Furthermore, the bottom valley portion inclusive of the center of bottom portion was measured for its yielding load (kg/cm). The results were as shown in Table 2.

Performance Testing

In each example, ten containers were filled with carbonated water of 2.3 gas volumes (GV) and 2.6 gas volumes (GV), and were capped. Then, hot water heated at 70° C. was poured from the upper side of the containers for 30 minutes to sterilize the contents by heating. During the sterilization by heating, the temperature at the center of the bottom portion raised to a maximum of 68 Åé. The bottom portions of the containers after the sterilization by heating was finished and after cooled, were measured in regard to their amounts of deformation to examine the number of the containers lacking self-standing ability in which the foot portions possessed a negative height H, i.e., the center of the bottom portion was downwardly protruding beyond the foot portions. The results were as shown in Table 2.

TABLE 2

|  | Example 1 | Comparative Example 1 | Example 2 | Comparative Example 2 |
|---|---|---|---|---|
| Final container |  |  |  |  |
| Center of bottom |  |  |  |  |
| $T_3$ (mm) | 0.45 | 1.55 | 1.31 | 1.50 |
| $X_3$ (%) | 47.0 | 1.9 | 3.6 | 2.1 |
| Valleys in the periphery of bottom center |  |  |  |  |
| $T_4$ (mm) | 0.72 | 1.2 | 0.45 | 1.41 |
| $X_4$ (%) | 40.9 | 6.4 | 42.0 | 3.1 |
| Yielding load of valleys (kg/cm) | 33.2 | 21.5 | 27.8 | 18.5 |
| Number of defective containers (per 10 containers) in the heat resistance/ pressure resistance testing |  |  |  |  |
| 2.3 GV | 0 | 10 | 0 | 10 |
| 2.6 GV | 0 | 10 | 6 | 10 |

Comparative Testing 2

Relying upon the two-stage blow-molding method, a polyethylene terephthalate (PET) container was prepared having a maximum barrel diameter $D_0$ of the final product of 91 mm, an overall height of 303 mm and a capacity of 1500 ml, the bottom portion thereof being constituted by six foot portions and valley portions.

The container was prepared in accordance with the procedure of Example 1 in Comparative Testing 1.

Three kinds of metal molds for secondary blow-molding were provided by changing the diameter $D_S$ of the grounding portion, width W of the grounding portion and the distance Y between the center of the bottom portion and the grounding portion in the bottom portion.

In the bottom of the metal mold for secondary blow-molding, in this case, the radius $R_1$ of curvature of the bottom valley portions near the center of bottom portion was 67 mm, the ratio $S'/S_0'$ of the surface area $S_0'$ of the imaginary curved surface of the bottom portion within 40% of the barrel diameter $D_0$ to the total surface area $S'$ of the bottom valley portions within 40% of the barrel diameter $D_0$ was 0.72, the ratio $S/S_0$ of the surface area $S_0$ of the imaginary curved surface of the bottom portion within 80% of the barrel diameter $D_0$ to the total surface area S of the bottom valley portions within 80% of the barrel diameter $D_0$ was 0.31, the height H of foot portions was 4 mm, and the foot opening angle θ including the valley portion was 71° on a plane crossing the foot portions and perpendicular to the valley portions.

The containers were prepared by using the above three kinds of metal molds (Example 3, Example 4, Comparative Example 3), and were measured concerning the shape of the grounding portion in the bottom portion of the containers, i.e., concerning the ratio $D_S/D_0$ of the barrel diameter $D_0$ to the diameter $D_S$ of the grounding portion, width W of the grounding portion, and the ratio $Y/R_0$ of the radius $R_0$ of the barrel portion to the distance Y between the center of bottom portion and the grounding portion. The results of measurement were as shown in Table 3.

The thus obtained empty containers were further measured for their overturning angles α. The results were as shown in Table 3.

TABLE 3

|  | $D_sD_0$ | W (mm) | $Y/R_0$ | α (deg.) |
| --- | --- | --- | --- | --- |
| Example 3 | 0.71 | 3.5 | 0.63 | 10.4 |
| Example 4 | 0.73 | 3.0 | 0.65 | 10.8 |
| Comp. Example 3 | 0.65 | 1.5 | 0.57 | 9.5 |

Comparative Testing 3

Relying upon the two-stage blow-molding method, a polyethylene terephthalate (PET) container was prepared having a maximum barrel diameter $D_0$ of the final molded article of 91 mm, an overall height of 303 mm and a capacity of 1500 ml, the bottom portion thereof being constituted by six foot portions and valley portions.

The container was prepared in accordance with the procedure of Example 1 in Comparative Testing 1.

Five kinds of metal molds were provided having a foot height H of 4.5 mm while suitably changing the values of foot opening angle θ including the valley portion on a plane crossing the foot portions and perpendicular to the valley portions, the ratio $S'/S_0'$ of the surface area $S_0'$ of the imaginary curved surface of the bottom portion within 40% of the barrel diameter $D_0$ to the total surface area S' of the bottom valley portions within 40% of the barrel diameter $D_0$, the ratio $S/S_0$ of the surface area $S_0$ of the imaginary curved surface of the bottom portion within 80% of the barrel diameter $D_0$ to the total surface area S of the bottom valley portions within 80% of the barrel diameter $D_0$, and the ratio $R_1/R_0$ of the radius $R_0$ of the barrel portion to the radius $R_1$ of curvature of the bottom valley portion near the center of the bottom portion.

Table 4 shows in numerical values the bottom shapes of the five metal molds for secondary blow-molding used for the testing. The containers were prepared by using the five metal molds (Example 5, Example 6, Comparative Example 4, Comparative Example 5, Comparative Example 6), and were examined for their thicknesses and degrees of crystallinity at various portions.

In all of the cases, the bottom valley portions within a radius of 30 mm inclusive of the center of bottom portion of the containers possessed a thickness of from 0.4 to 0.7 mm, and a degree of crystallinity of from 30 to 47%. Table 4 also shows minimum thicknesses Tmin at the ends of foot portions of the containers.

Performance Testing

In each example, ten containers were filled with carbonated water of 2.6 gas volumes (GV) and were capped. Then, hot water heated at 7° C. was poured from the upper side of the containers for 30 minutes to sterilize the contents by heating. During the sterilization by heating, the temperature at the center of the bottom raised to a maximum of 68° C.

The bottom portions of the containers after the sterilization by heating was finished and after cooled, were measured in regard to their amounts of deformation to examine the number of the containers (per 10 containers) lacking self-standing ability in which the foot portions possessed a negative height H. i.e., the center of the bottom portion was downwardly protruding beyond the foot portions. The results were as shown in Table 4.

TABLE 4

|  | θ (deg.) | $S'/S_0'$ | $S/S_0$ | $R_1/R_0$ | $T_{min}$ (mm) | Number of defective containers |
| --- | --- | --- | --- | --- | --- | --- |
| Example 5 | 71 | 0.74 | 0.32 | 1.65 | 0.22 | 0 |
| Comp. Ex. 5 | 71 | 0.50 | 0.2 | 1.0 | 0.05 | 0 |
| Comp. Ex. 5 | 71 | 0.45 | 0.17 | 1.47 | 0.21 | 10 |
| Example 6 | 66 | 0.72 | 0.31 | 1.47 | 0.18 | 0 |
| Comp. Ex. 6 | 55 | 0.50 | 0.2 | 1.47 | 0.15 | 10 |

Comparative Testing 4

By using an apparatus based upon the two-stage blow-molding method shown in FIGS. 8 to 23, a polyethylene terephthalate container was prepared having a maximum barrel diameter $D_0$ of the final product of 91 mm, an overall height of 303 mm and a capacity of 1500 ml, the bottom portion thereof being constituted by six foot portions and valley portions.

A preform with bottom was spherulited at its bottom portion and mouth-and-neck portion by the infrared-ray heating as shown in FIG. 19. The preform was subjected to the primary blow-molding by using a metal mold for primary blow-molding having, as shown in FIG. 23, a height of 318 mm, a diameter of the barrel portion continuous to the bottom portion of 91 mm, and having, at the center of the bottom portion thereof, a recessed portion of a diameter of 30 mm and a depth of 2 mm. In the primary blow-molding, the preform was first heated at a drawing temperature and was introduced into the metal mold. Then, the bottom portion of the preform was held by the stretching rod installed in the preform and the pressing rod installed on the outside. The compressed air of 20 kgf/cm² was blown into the preform to blow-mold it while pushing up the bottom portion of the preform by the stretching rod in order to obtain a secondary molded article. In this case, the stretching rod and the pressing rod were made of a steel, and were used in a state of room temperature during the blow-molding.

As a comparative testing, secondary articles were prepared under the conditions of Example 7 and Comparative Example 7 by setting the differences in the heating temperatures to be 0° C. and 13° C., respectively, between the barrel portion and the bottom portion of the preform. Table 5 shows the molding conditions and measured values of the thickness $T_2$ (mm) and the degree of crystallinity $X_2$ (%) at portions of a radius of 10 mm from the center of bottom portion of the obtained secondary articles. In all of these cases, the spherulited portion at the center of bottom portion of the secondary article possessed a diameter of 15 mm and a thickness of about 1.5 mm.

Then, the secondary article while being rotated was moved through a tunnel-like heat-treating apparatus having planar infrared-ray radiators arranged along the top surface and the side surface thereof, the planar infrared-ray radiators incorporating an electric heater in the ceramic material, so that the bottom portion of the secondary article and part of the barrel portion continuous to the bottom portion were heat-shrunk thereby to obtain a tertiary article. The temperatures of the infrared-ray radiators were 900° C. on the top surface and 750° C. on the side surface. The heating time was 6 seconds. The heated portions of the obtained tertiary product possessed the shapes that were relatively close to the shapes of bottom valleys of the final container and could be sufficiently accommodated.

Finally, by using the metal mold for secondary blow-molding having the bottom portion of a predetermined shape including six foot portions and valley portions, the tertiary article that has been heated was secondarily blow-molded by blowing the compressed air of 40 kgf/cm² to obtain the container. In the bottom of the metal mold for secondary blow-molding, the radius $R_1$ of curvature of the bottom valley portions near the center of bottom portion was 67 mm, the ratio $S'/S_0'$ of the surface area $S_0$ of the imaginary curved surface of the bottom portion within 40% of the barrel diameter $D_0$ to the total surface area S' of the bottom valley portions within 40% of the barrel diameter $D_0$ was 0.72, the ratio $S/S_0$ of the surface area $S_0$ of the imaginary curved surface of the bottom portion within 80% of the barrel diameter $D_0$ to the total surface area S of the bottom valley portions within 80% of the barrel diameter $D_0$ was 0.31, the height H of foot portions was 4 mm, and the foot opening angle θ including the valley portion was 71° on a plane crossing the foot portions and perpendicular to the valley portions.

The containers obtained by using two kinds of samples and by changing the primary blow-molding conditions were measured in regard to the thickness $T_4$ (mm) and degree of crystallinity $X_4$ (%) at the center of bottom portion, and thickness $T_4$ (mm) and degree of crystallinity $X_4$ (%) at valley portions in the periphery of the bottom center 10 mm away from the center of bottom portion. In all of these cases, the spherulited portion at the center of the bottom portion possessed a diameter of 15 mm, a thickness of about 1.5 mm, and a degree of crystallinity of about 38%. The results were as shown in Table 5.

Performance Testing

In each example, ten containers were filled with carbonated water of 2.6 gas volumes (GV) and were capped. Then, hot water heated at 70° C. was poured from the upper side of the containers for 30 minutes to sterilize the contents by heating. During the sterilization by heating, the temperature at the center of bottom portion raised to a maximum of 68° C. The bottom portions of the containers after the sterilization by heating was finished and after cooled, were measured in regard to their amounts of deformation to examine the number of the containers lacking self-standing ability in which the foot portions possessed a negative height H, i.e., the center of bottom portion was downwardly protruding beyond the foot portions. The results were as shown in Table 5.

TABLE 5

| | Example 7 | Comp. Ex. 7 |
|---|---|---|
| Temp. For heating preform in the primary blow-molding | | |
| Barrel (° C.) | 100 | 100 |
| Bottom (° C.) | 100 | 87 |

TABLE 5-continued

| | Example 7 | Comp. Ex. 7 |
|---|---|---|
| Measured at a position 10 mm away from the center of bottom of secondary article | | |
| $T_2$ (mm) | 0.35 | 1.43 |
| $X_2$ (%) | 25 | 2 |
| Measured at a position 10 mm away from the center of bottom of container | | |
| $T_4$ (mm) | 0.41 | 1.32 |
| $X_4$ (%) | 42 | 4.3 |
| Yield load at bottom valley portion of container (kg/cm) | 38.3 | 19 |
| Number of detective containers (per 10 containers) in a heat resistance/pressure resistance testing | 0 | 10 |

It will be understood from the results of the above-mentioned comparative testings, that the container of the present invention has excellent heat resistance, pressure resistance and is less likely to be overturned.

The heat resistant and pressure resistant polyester bottle of the present invention can be effectively used in the applications where it is filled with a content which by itself produces a pressure and is sterilized or pasteurized by heating, and is useful as a container for preserving carbonated beverages, nitrogen-containing beverages and seasonings. The heat resistant and pressure resistant container can hold a gas in amounts of up to about three VOLs, and sterilization can be effected by heating suitably at a temperature of from 60 to 80° C.

We claim:

1. A heat-resistant, pressure-resistant and self-standing container having a mouth-and-neck portion, a shoulder portion, a barrel portion and a bottom portion that includes valley portions and foot portions obtained by biaxially stretch-blow-molding a polyester resin, wherein the whole container, except the mouth-and neck portion, inclusive of a center of the bottom portion, is reduced in thickness under a highly drawing condition without being accompanied by whitening, so as to have a degree of crystallinity of not smaller than 20% and the bottom valley portions have a yielding load of not smaller than 25 kg/cm at 70° C., and that the whole container, except the mouth-and-neck portion has a thickness of from 0.15 to 1 mm.

2. A container according to claim 1, wherein the bottom portion is heat-set so that the bottom valley portions within a circle which is 50% of the barrel diameter $D_0$ have a degree of crystallinity of from 30 to 55%.

3. A container according to claim 1, wherein the container has a thickness of from 0.3 to 1 mm in the bottom valley portions inclusive of the center of the bottom portion.

4. A container according to claim 1, wherein the ratio $R_1/R_0$ of the radius $R_0$ of the barrel portion continuous to the bottom portion to the radius $R_1$ of curvature at the bottom valley portion of a generally spherical shape inclusive of the center of the bottom is from 1.3 to 2, and the diameter $D_1$ of the bottom valley portion of a roughly spherical shape having the radius $R_1$ of curvature is from 62% to 90% of the barrel diameter $D_0$.

5. A container according to claim 1, wherein the total surface area S' of the bottom valley portions within 40% of the barrel diameter $D_O$ is from 52% to 80% of the surface area $S_O'$ of the imaginary spherical surface of the bottom portion which is partly formed by the bottom valley portions within 40% of the barrel diameter $D_O$, and the total surface area S of the bottom valley portions within 80% of the barrel diameter $D_O$ is from 20% to 45% of the surface area $S_O$ of the imaginary spherical surface of the bottom portion which is partly formed by the bottom valley portions within 80% of the barrel diameter $D_0$.

6. A container according to claim 1, wherein the diameter $D_F$ of the root of foot portions at the center of the bottom portion is from 22% to 35% of the barrel diameter $D_O$.

7. A container according to claim 1, wherein the foot opening angle θ including a valley portion is from 65° to 90° on a plane which leads to at least the ends of the foot portions, crosses the foot portions and is perpendicular to the valley portions.

8. A container according to claim 1, wherein the foot portions are continuous to the root portion at the center of the bottom portion by a curve which is not continuous to the valley portions, and a portion connecting the end of the foot portion to the root portion protrudes downwards.

9. A container according to claim 1, wherein the bottom portion has a thickness of from 0.15 mm to 1 mm, the bottom valley portions have a thickness of from 0.3 mm to 1 mm, the radius $R_1$ of curvature near the center of the valley portion is from 1.3 to 2 times as great as the radius $R_O$ of curvature of the barrel portion, the total surface area S' of the bottom valley portions within 40% of the barrel diameter $D_O$ is from 52% to 80% of the surface area $S_0'$ of the imaginary spherical surface of the bottom portions which is partly formed by the bottom valley portion within 40% of the barrel diameter $D_O$, the total surface area S of the bottom valley portions within 80% of the barrel diameter $D_O$ is from 20% to 45% of the surface area $S_O$ of the imaginary spherical surface of the bottom portion which is partly formed by the bottom valley portions within 80% of the barrel diameter $D_O$, and the foot opening angel θ including a valley portion is from 65° to 90° on a plane which leads to at least the ends of the foot portions, crosses the foot portions and is perpendicular to the valley portions.

10. A heat-resistant, pressure-resistant and self-standing container having a mouth-and-neck portion, a shoulder portion, a barrel portion and a bottom portion that includes valley portions and foot portions obtained by biaxially stretch-blow-molding a polyester resin, wherein the whole container, except the mouth-and-neck portion and the center of the bottom portion, is reduced in thickness under a highly drawing condition without being accompanied by whitening, so as to have a thickness of from 0.15 to 1 mm, the bottom within a circle which is 50% of the barrel diameter $D_O$ have a degree of crystallinity of from 30 to 55%, and the bottom valley portions have an yielding load of not smaller than 25 kg/cm at 70° C.

11. A container according to claim 10, wherein the center of the bottom portion is spherulited and the diameter of the spherulited portion is from 5 to 28% of the barrel diameter $D_O$.

12. A container according to claim 10, wherein the ratio $R_1/R_0$ of the radius $R_0$ of the barrel portion continuous to the bottom portion to the radius $R_1$ of curvature at the bottom valley portion of a generally spherical shape inclusive of the center of the bottom is from 1.3 to 2, and the diameter $D_1$ of the bottom valley portion of a roughly spherical shape having the radius $R_1$ of curvature is from 62% to 90% of the barrel diameter $D_0$.

13. A container according to claim 10, wherein the total surface area S' of the bottom valley portions within 40% of the barrel diameter $D_0$ is from 52% to 80% of the surface area $S_0'$ of the imaginary spherical surface of the bottom portion which is partly formed by the bottom valley portions within 40% of the barrel diameter $D_0$, and the total surface area S of the bottom valley portions within 80% of the barrel diameter $D_0$ is from 20% to 45% of the surface area $S_0$ of the imaginary spherical surface of the bottom portion which is partly formed by the bottom valley portions within 80% of the barrel diameter $D_0$.

14. A container according to claim 10, wherein the diameter $D_F$ of the root of foot portions at the center of the bottom portion is from 22% to 35% of the barrel diameter $D_0$.

15. A container according to claim 10, wherein the foot opening angle θ including a valley portion is from 65° to 90° on a plane which leads to at least the ends of the foot portions, crosses the foot portions and is perpendicular to the valley portions.

16. A container according to claim 10, wherein the foot portions are continuous to the root portion at the center of the bottom portion by a curve which is not continuous to the valley portions, and a portion connecting the end of the foot portion to the root portion protrudes downwards.

17. A container according to claim 10, wherein the radius $R_1$ of curvature near the center of the valley portion is from 1.3 to 2 times as great as the radius $R_0$ of curvature of the barrel portion, the total surface area S' of the bottom valley portions within 40% of the barrel diameter $D_0$ is from 52% to 80% of the surface area $S_0'$ of the imaginary spherical surface of the bottom portions which is partly formed by the bottom valley portion within 40% of the barrel diameter $D_0$, the total surface area S of the bottom valley portions within 80% of the barrel diameter $D_0$ is from 20% to 45% of the surface area $S_0$ of the imaginary spherical surface of the bottom portion which is partly formed by the bottom valley portions within 80% of the barrel diameter $D_0$, and the foot opening angle θ including a valley portion is from 65° to 90° on a plane which leads to at least the ends of the foot portions, crosses the foot portions and is perpendicular to the valley portions.

* * * * *